United States Patent
Borisov et al.

(10) Patent No.: US 12,416,815 B2
(45) Date of Patent: Sep. 16, 2025

(54) WAVEGUIDE ARCHITECTURE BASED ON DIFFRACTIVE OPTICAL ELEMENTS FOR AUGMENTED REALITY DISPLAYS WITH A WIDE FIELD OF VIEW

(71) Applicant: Samsung Electronics Co., Ltd., Suwon-si (KR)

(72) Inventors: Vladimir Nikolaevich Borisov, St. Petersburg (RU); Aleksandr Evgenyevich Angervaks, St. Petersburg (RU); Nikolay Viktorovich Muravyev, Podolsk (RU); Roman Aleksandrovich Okun, St. Petersburg (RU); Mikhail Vyacheslavovich Popov, Krasnogorsk (RU); Gavril Nikolaevich Vostrikov, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 404 days.

(21) Appl. No.: 18/175,035

(22) Filed: Feb. 27, 2023

(65) Prior Publication Data
US 2023/0221570 A1 Jul. 13, 2023

Related U.S. Application Data

(63) Continuation of application No. PCT/KR2021/013947, filed on Oct. 8, 2021.

(30) Foreign Application Priority Data

Oct. 8, 2020 (RU) .................................. 2020133191
Aug. 23, 2021 (KR) ......................... 10-2021-0111261

(51) Int. Cl.
*G02B 27/10* (2006.01)
*G02B 27/42* (2006.01)

(52) U.S. Cl.
CPC ..... *G02B 27/1013* (2013.01); *G02B 27/1086* (2013.01); *G02B 27/4244* (2013.01)

(58) Field of Classification Search
CPC .................................................. G02B 27/1013
See application file for complete search history.

(56) References Cited

U.S. PATENT DOCUMENTS 6,921,452 B2   7/2005   Veligdan
9,933,684 B2   4/2018   Brown et al.
(Continued)

FOREIGN PATENT DOCUMENTS

CN    1323402 A    11/2001
CN    105807348 A   7/2016
(Continued)

OTHER PUBLICATIONS

Extended European Search Report dated Apr. 26, 2024, issued in European Patent Application No. 21878070.8.
(Continued)

*Primary Examiner* — Edmond C Lau
(74) *Attorney, Agent, or Firm* — Jefferson IP Law, LLP

(57) ABSTRACT

The disclosure relates to augmented reality devices, namely to near-field displays, to planar waveguides with diffractive optical elements and displays based on such planar waveguides. The architecture of diffractive optical elements, performed in a waveguide and a method for operating the architecture of diffractive optical elements, eliminating image dispersion and expanding the horizontal field of view are provided. The method for operating the architecture of diffractive optical elements, expanding the vertical field of view and a device for displaying an augmented reality containing the proposed architecture of diffractive optical elements are provided. The augmented reality glasses includes the proposed augmented reality display device.

18 Claims, 13 Drawing Sheets

(56) References Cited

U.S. PATENT DOCUMENTS

| | | | |
|---|---|---|---|
| 10,185,151 | B2 | 1/2019 | Lee et al. |
| 10,585,287 | B2 | 3/2020 | Lee et al. |
| 11,016,300 | B2 | 5/2021 | Tekolste et al. |
| 11,231,612 | B2 | 1/2022 | Oh et al. |
| 11,256,093 | B2 | 2/2022 | Curtis et al. |
| 11,460,621 | B2 | 10/2022 | Popovich et al. |
| 11,467,416 | B2 | 10/2022 | Cheng et al. |
| 11,526,007 | B2 | 12/2022 | Klug et al. |
| 2016/0077338 | A1 | 3/2016 | Robbins et al. |
| 2017/0322426 | A1* | 11/2017 | Tervo .................. G02B 27/4272 |
| 2018/0292653 | A1 | 10/2018 | Tervo |
| 2019/0107723 | A1 | 4/2019 | Lee et al. |
| 2019/0212557 | A1 | 7/2019 | Waldern et al. |
| 2020/0041712 | A1 | 2/2020 | Peroz et al. |
| 2020/0142109 | A1* | 5/2020 | Olkkonen ............ G02B 6/0016 |
| 2020/0142202 | A1 | 5/2020 | Lee et al. |
| 2021/0109347 | A1* | 4/2021 | Blomstedt .......... G02B 27/0081 |
| 2022/0197036 | A1 | 6/2022 | Valera et al. |
| 2024/0210612 | A1* | 6/2024 | Shramkova .......... G02B 6/0036 |

FOREIGN PATENT DOCUMENTS

| | | |
|---|---|---|
| CN | 106716226 A | 5/2017 |
| CN | 106842397 A | 6/2017 |
| CN | 103823267 B | 5/2019 |
| CN | 110582716 A | 12/2019 |
| CN | 110824708 A | 2/2020 |
| CN | 111025657 A | 4/2020 |
| EP | 3 339 936 A1 | 6/2018 |
| KR | 10-2017-0015942 A | 2/2017 |
| KR | 10-2019-0126124 A | 11/2019 |
| KR | 10-2020-0079274 A | 7/2020 |
| KR | 10-2020-0095509 A | 8/2020 |
| WO | 2018/118286 A1 | 6/2018 |
| WO | 2018/224847 A2 | 12/2018 |
| WO | 2019/136476 A1 | 7/2019 |
| WO | 2019/220072 A1 | 11/2019 |
| WO | 2020/084275 A1 | 4/2020 |

OTHER PUBLICATIONS

European Office Action dated Jan. 4, 2024, issued in European Patent Application No. 21 878 070.8.

International Search Report dated Feb. 8, 2022, issued in International Patent Application No. PCT/KR2021/013947.

* cited by examiner

RELATED ART

WAVEGUIDE ARCHITECTURE BASED ON DIFFRACTIVE OPTICAL ELEMENTS FOR AUGMENTED REALITY DISPLAYS WITH A WIDE FIELD OF VIEW

CROSS-REFERENCE TO RELATED APPLICATION(S)

This application is a continuation application, claiming priority under § 365(c), of an International application No. PCT/KR2021/013947, filed on Oct. 8, 2021, which is based on and claims the benefit of a Russian patent application number 2020133191, filed on Oct. 8, 2020, in the Russian Intellectual Property Office, and of a Korean patent application number 10-2021-0111261, filed on Aug. 23, 2021, in the Korean Intellectual Property Office, the disclosure of each of which is incorporated by reference herein in its entirety.

BACKGROUND

1. Field

The disclosure relates to augmented reality devices, namely to near-field displays. More particularly, the disclosure relates to planar waveguides with diffractive optical elements and displays based on such planar waveguides.

2. Description of Related Art

The concept of augmented reality is to create an image with a virtual image superimposed on the real picture of the world. The user may view augmented reality picture using augmented reality viewing devices, in particular augmented reality glasses.

Wearable augmented reality (AR) glasses are a personal device that may be used as an additional screen, for example, for smartphones or other electronic devices. For the mass consumer, it is necessary to develop devices of augmented reality glasses with a wide field of view (FOV), lower weight and cost, compactness and high resolution, such wearable devices may replace televisions (TVs) and smartphones for the user. At this stage of the development of the art, the maximum field of view is 600 diagonals.

The following requirements are imposed on augmented reality glasses systems:
- a wide field of view so that the human eye may cover the entire area that it sees, the ability to superimpose virtual images over a large area;
- good image quality;
- light weight;
- compactness;
- lower cost; and
- high resolution, high contrast, etc.

In achieving such requirements, problems arise, associated, for example, with the fact that a wide field of view requires providing a wide area within which the eye may see the entire image completely, without loss. There are different approaches to achieving these requirements. Some approaches may provide a wide field of view, but cannot provide a wide area within which the eye may see the entire image completely, without loss. Other approaches may provide a wide area within which the eye may see the entire image without loss, but cannot provide a wide field of view. The classic way to increase the width of the field of view is to increase the number of waveguides in augmented reality devices. However, an increase in the number of waveguides leads to an increase in the overall dimensions of the augmented reality device, the weight of the augmented reality device, and a decrease in the device resolution.

FIG. 1 schematically illustrates the limitation of the field of view when using diffractive optical elements in augmented reality devices according to the related art.

Referring to FIG. 1, the abscissa is the horizontal field of view (FOV), the ordinate is the vertical field of view. At the intersection of the abscissa axis and the ordinate axis, a square is shown, which is an image that must be transmitted to the user for viewing. If the transmitted image interacts with a diffractive optical element, which takes the transmitted image to the right (arrow of the vector Kin) and the image enters inside the ring shown in FIG. 1. The ring represents the region of the angular components of the propagating radiation (the region of the components of the wave vectors of the propagating radiation) that propagate in the waveguide, but do not propagate outside the waveguide. A corner component represents a specific point on an angular grid with angular coordinates such as Bx, By, and Bz. The inner boundary of the ring is the area of the angle of total internal reflection (TIR), that is, the critical angle at which radiation propagates without leaving the waveguide. The outer boundary of the ring is the boundary of the radiation existing inside the waveguide, that is, the angle of propagation of radiation is 900 inside the waveguide. Thus, there is radiation inside the waveguide that propagates at angles from the TIR angle to an angle of 900. That is, when the image interacts with the input diffraction grating, a part of the image is cut off, since only a part of the image remains, which may exist only in the aforementioned range of angles, that is, the image is cut off in this case horizontally—right and left. Further, when interacting with a multiplying diffraction grating, the vector of which is marked in FIG. 1 as Kexp, part of the corners is also cut off from the image with the same borders, but vertically. When the image is displayed, a small vertically and horizontally cropped image remains.

That is, each of the diffractive optical elements gives its own limitation in the field of view, thus, the fewer diffractive optical elements are contained in the augmented reality device, the better.

To create a two-dimensional image, at least three diffractive optical elements, an introductory diffractive element, multiplying the diffractive element and an outgoing diffractive element are required. The three diffractive optical elements are referred to herein as a set of diffractive optical elements. FIG. 1 illustrates one set of diffractive optical elements that outputs a specific portion of the field of view.

It should be noted that for the most commonly used optical materials with a refractive index of 1.5, the resulting field of view formed by such a set of diffractive optical elements is 300 by 300.

The standard way to increase the field of view is to increase the number of waveguides that transmit the image. However, the increase in the number of waveguides increases the thickness of the augmented reality display, weight, and also decreases the transparency of such augmented reality display. If, at the same time, the thickness of the waveguides is reduced, this will lead to a deterioration in the image perceived by the eye, since with a decrease in the thickness of the waveguide, more than one image output enters the pupil, due to the unevenness and non-flatness of the waveguide itself, more than one input image enters into the eyes, that is, double vision occurs image, the resolution begins to drop sharply, the image quality deteriorates.

Also, to increase the field of view, the refractive index of waveguides and materials of diffractive optical elements is increased. As the refractive index increases, the range of angles that exist in the waveguide but which do not exist in air increases. Thus, the user sees an image with a large field of view. However, the fundamental problem with this solution is that materials with a high refractive index have absorption in the blue region of the spectrum, which means that when the user views the image, the blue part of the spectrum of the real image is lost, in addition, it is impossible to transmit the blue part of the spectrum of the virtual superimposed image, then there is a loss of color in the image.

Also in the prior art, the field of view is increased by changing the architecture of the planar waveguides. The most famous change is that instead of using one set of diffractive optical elements, two sets of diffractive optical elements are used, each of the sets giving a different part of the field of view. It should be noted that when using two sets it is possible to double the width of the field of view, but only the vertical field of view is increased, while it is preferable to increase both the vertical field of view and the horizontal field of view. That is, with this approach, there is a loss of the horizontal form factor. The term "form factor" refers to the aspect ratio of the displayed image. The horizontal form factor is an image with a larger horizontal margin than a vertical one. The vertical form factor is an image with a larger vertical margin than a horizontal one.

The horizontal or vertical form factor indicates the aspect ratio of the displayed image. However, if the vertical form factor and the input diffraction grating are located in relation to the output diffraction grating, for example, on the left, then if the waveguide is turned by 90°, then the input diffraction grating will be on top, and the form factor will change from the vertical form factor to horizontal form factor. If the in-coupling diffractive element is on top, then the light must also be introduced into it from above, that is, the image projector must also be attached from above. Thus, the glasses become bulky and more like a helmet.

That is, to reduce the size, it is desirable that the image projector is located on the side while maintaining the horizontal form factor.

Another problem with augmented reality devices is their color dispersion. That is, if there is one waveguide with a certain number of sets of diffraction gratings that transmit an image, then such a waveguide will not transmit a full-color image over the entire image field, one part of the image will be visible to the user in red, another part of the image will be visible to the user in green and the third part of the image will be visible to the user in blue. The user will only have access to a small area where he may see the full color image. To solve such a problem, the prior art uses several waveguides, each waveguide being responsible for its own color, or for two adjacent colors. Thus, the thickness of the augmented reality device is increased.

From the prior art, document US20190212557 A1 is known, publication date 11 Jul. 2019, which discloses waveguide architectures.

The document provides systems and methods for creating head-up displays (HUDs) using waveguides that include Bragg gratings. The disadvantage of the known solution is the small width of the field of view, the large overall dimensions of the device.

Known from the prior art is document US2019004321 A1, publication date 3 Jan. 2019, is known, which discloses an optical device for expanding incoming light in two dimensions for an augmented reality display. The device consists of a waveguide (12) and three linear diffraction gratings H0, H1, and H2. The incident beam from the projector illuminates the input grating H0 with polychromatic light, and this light enters the waveguide (12). The other two lattices H1 and H2 are superimposed on one another. Light may diffract on one grating H1 in the first diffraction order and in the direction of another grating H2, which may direct light from the waveguide (12) to the observer. The disadvantage of the known solution is the small width of the field of view, the large overall dimensions of the device.

Known from the prior art is document U.S. Pat. No. 9,927,614 B2, publication date 27 Mar. 2018, is known, which discloses a near optical display system that may be used in augmented reality applications and devices. The system includes a diffractive waveguide having diffractive optical elements (DOE) configured for input, exit pupil dilation, and output. An electro-modulated tunable liquid crystal (LCD) lens is positioned between the diffraction grating and the user's eyes. The polarizing filter is located on the other side of the diffraction grating so that light from the real world enters the system with a certain polarization state. The disadvantage of the known solution is the small width of the field of view, the large overall dimensions of the device.

The prototype of the disclosure is the solution disclosed in document U.S. Ser. No. 10/185,151 B2, publication date 22 Jan. 2019. The known solution provides a waveguide display with a small form factor, a wide area within which the eye may see the entire image completely, without loss, and a wide field of view. A known waveguide display is used to present media to a user. The waveguide display includes a light source assembly, an output waveguide, and a controller. The light source assembly includes one or more projectors projecting an image along at least one dimension. The output waveguide consists of a waveguide body with two opposite surfaces. The output waveguide includes a first grating receiving image light propagating along the input wave vector, a second grating, and a third grating opposite the second grating and outputting the expanded image light with wave vectors corresponding to the input wave vector. The controller controls the scanning of one or more source assemblies to form a 2D image. However, the disadvantage of the known solution is also the insufficient width of the field of view, since in order to increase the width of the field of view in the known solution only two sets of optical elements are used; the large overall dimensions of the device are also a disadvantage.

Known solutions assume a small width of the field of view, an increase in the number of waveguides used implies an increase in the thickness of the display, a decrease in the thickness of the waveguides leads to a deterioration in resolution, the use of a high refractive index gives a loss of color, the use of two sets of diffractive optical elements gives an image input from above, due to which the overall characteristics are lost. That is, at this stage of the development of the field of technology under consideration, there is no solution that would allow a full-color image with a wide field of view using only one waveguide.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, aspect of the disclosure, is to provide a wide field of view with a small thickness and full color, with good resolution and with the introduction of radiation from the side.

Additional aspects will be set forth in part in the description which follows and, in part, will be apparent from the description, or may be learned by practice of the presented embodiments.

In accordance with an aspect of the disclosure, an architecture (structure) of diffraction optical elements in a waveguide for an augmented reality device is provided. The architecture (structure) includes an in-coupling diffractive element configured to input radiation from the projector, and including a first linear diffractive optical element of the in-coupling diffractive element and a second linear diffractive optical element of in-coupling diffractive element, a first multiplying diffractive element and a second multiplying diffractive element configured to multiply radiation, an out-coupling diffractive element configured to multiply radiation and output radiation from the waveguide, and includes a first linear diffractive optical element of the out-coupling diffractive element, a second linear diffractive optical element of the out-coupling diffractive element, a third linear diffractive optical element of the out-coupling diffractive element, moreover, the in-coupling diffractive element is configured during the operation of the augmented reality device, to separate the image from the projector into the color components of the image red, green, blue, and the direction of the path of the beam of each of the color components through the corresponding set of diffractive elements, wherein along the course of radiation: first set of diffractive elements consists from the first linear diffractive optical element of the in-coupling diffractive element, the first and second linear diffractive elements of the out-coupling diffractive element, second set of diffractive elements consists from the first linear diffractive optical element of the in-coupling diffractive element, the second and first linear diffractive elements of the out-coupling diffractive optical element, the third set of diffractive elements consists of a second linear diffractive optical element of the in-coupling diffractive element of the first multiplying diffractive optical element and the third linear diffractive optical element of the out-coupling diffractive element, the fourth set of diffractive elements consists of a second linear diffractive optical element of an in-coupling diffractive element, a second multiplying diffractive element and a third linear diffractive optical element of an out-coupling diffractive element. At that the sum of the vectors of all diffractive elements in each set is equal to zero. At that the first set of diffractive elements and the third set of diffractive elements are configured to conduct the upper part of the field of view, the second set of diffractive elements and the fourth set of diffractive elements are configured to conduct the lower part of the field of view.

The direction of the path of the beams of each of the color components depends on the parameters of the diffractive elements, Equation 1

$$\begin{cases} |\vec{k}_{\lambda_b,\theta,\delta} - \vec{K_5}| = \frac{2\pi n_{\lambda_b}}{\lambda_b} \\ |\vec{k}_{\lambda_g,...\theta,0} + \vec{K_6}| = \frac{2\pi}{\lambda_g} \\ |\vec{k}_{\lambda_g,\theta,0} + \vec{K_5} + \vec{K_6}| = \frac{2\pi}{\lambda_g} \\ |\vec{k}_{\lambda_r,\theta,0} - \vec{K_7}| = \frac{2\pi n_{\lambda_r}}{\lambda_r} \\ |\vec{k}_{\lambda_b,\theta,0} + \vec{K_1}| = \frac{2\pi n_{\lambda_b}}{\lambda_b} \\ (\vec{k}_{\lambda_b,\theta,0} + \vec{K_1})_x = 0 \\ 0 = \min\left(|\vec{k}_{\lambda_g,...\theta,\delta} - \vec{K_7}| - \frac{2\pi}{\lambda_g}, |\vec{k}_{\lambda_b,...\theta,...\delta} + \vec{K_1}| - \frac{2\pi}{\lambda_b}\right) \end{cases}$$

calculated from above system of equations.

where $\vec{k}_{l,x,y}$, is the wave vector of an electromagnetic wave, defined by three coordinates l, x, y, where l is the length of the electromagnetic wave, x is the angular coordinate of the electromagnetic wave in the x direction, y is the angular coordinate of the electromagnetic wave in the y direction, $n_{\lambda_b}$ is the refractive index of the optical system for the wavelength $\lambda_b$, $n_{\lambda_g}$ is the refractive index of the optical system for the wavelength $\lambda_g$, $n_{\lambda_r}$ is the refractive index of the optical system for the wavelength $\lambda_r$, $\lambda_b$ is the length of the electromagnetic wave corresponding to blue, $\lambda_b$ is the length of the electromagnetic wave corresponding to green, $\lambda_r$ is the length of the electromagnetic wave corresponding to red, θ is the maximum angle of the transmitted field of view in the x direction (the size of the field of view in the x direction is $2^\theta$), and δ is the maximum angle of the transmitted field of view in the y direction (the size of the field of view in the y direction is $2^\delta$).

wherein, the initial data for solving this system of equations are the used electromagnetic wavelengths ($\lambda_b$, $\lambda_g$, $\lambda_r$), the refractive indices of the optical system for the used wavelengths ($n_{\lambda_b}$, $n_{\lambda_g}$, $n_{\lambda_r}$) the aspect ratio of the sides of the field of view θ/δ, as well as the following geometric relationships of vectors of linear elements:

$\vec{K}_{5y}=0$, $\vec{K}_{6y}=0$, $\vec{K}_{7x}=\vec{K}_{8x}$, $\vec{K}_{1x}=\vec{K}_{2x}$, $\vec{K}_{1y}=-\vec{K}_{2y}$, $\vec{K}_{3x}=\vec{K}_{4x}$, $\vec{K}_{3y}=\vec{K}_{4y}$, moreover, vectors, $\vec{K_1}$, $\vec{K_2}$ correspond to "+1" and "−1" diffraction orders of the second linear diffractive optical element of the in-coupling diffractive element, vector $\vec{K_3}$ corresponds to the second multiplying diffractive optical element, vector $\vec{K_4}$ corresponds to the first multiplying diffractive optical element, vector $\vec{K_5}$ corresponds to third linear diffractive optical element of the out-coupling diffractive element, vector $\vec{K_6}$ corresponds to first linear diffractive optical element of the in-coupling diffractive element, vector $\vec{K_7}$ corresponds to second linear diffractive optical element of the out-coupling diffractive element, and vector $\vec{K_8}$ corresponds to first linear diffractive optical element of the out-coupling diffractive element.

The direction of the path of the beams of each of the color components depends on the parameters of the diffractive elements, Equation 2

$$\begin{cases} |\vec{k}_{\lambda_\delta,...\theta,0} - \vec{K_5}| = \frac{2\pi}{\lambda_b} \\ |\vec{k}_{\lambda_\delta,-\theta,\delta} - \vec{K_5}| = \frac{2\pi n_{\lambda_r}}{\lambda_r} \\ |\vec{k}_{\lambda_r,...\theta,\delta} - \vec{K_5} + \vec{K_8}| = \frac{2\pi}{\lambda_r} \\ |\vec{k}_{\lambda_r,...\theta,\varphi} - \vec{K_5} + \vec{K_8}| = \frac{2\pi n\lambda_r}{\lambda_r} \\ |\vec{k}_{\lambda_r,\theta,\psi} - \vec{K_5} + \vec{K_8}| = \frac{2\pi n\lambda_r}{\lambda_r} \\ \frac{2\pi}{\lambda_r} = \min(|\vec{k}_{\lambda_r,\theta,\psi} + \vec{K_2}|, |\vec{k}_{\lambda_r,...\theta,\varphi} + \vec{K_2}|) \\ (|\vec{k}_{\lambda_r,...\theta,0} + \vec{K_2}|)_x = 0 \\ |\vec{k}_{\lambda_b,\theta,0} + \vec{K_2}| = \frac{2\pi n_{\lambda_b}}{\lambda_0} \end{cases}$$

calculated from above system of equations.

where $\vec{k}_{l,x,y}$ is the wave vector of an electromagnetic wave, defined by three coordinates l, x, y, where l is the length of the electromagnetic wave, x is the angular coordinate of the electromagnetic wave in the x direction, y is the angular coordinate of the electromagnetic wave in the y direction, $n_{\lambda_b}$ is the refractive index of the optical system for the wavelength $\lambda_b$, $n_{\lambda_r}$ is the refractive index of the optical system for the wavelength $\lambda_r$, $\lambda_b$ is the length of the electromagnetic wave corresponding to blue, $\lambda_r$ is the length of the electromagnetic wave corresponding to red, and φ and ψ are the angles within the field of view in the y direction, which are the angles of contact of the two parts of the field of view, transmitted sets 1 and 2 and sets 3 and 4.

wherein, the initial data for solving this system of equations are the used electromagnetic wavelengths ($\lambda_b, \lambda_r$), the refractive indices of the optical system for the used wavelengths ($n_{\lambda_b}, n_{\lambda_r}, n_{\lambda_g}$), the aspect ratio of the sides of the field of view (θ/δ), well as the following geometric relationships of vectors of linear elements resulting from the geometric features of the waveguide architecture:

$$\vec{K}_{5y}=0, \vec{K}_{6y}=0, \vec{K}_{7x}=\vec{K}_{8x}, \vec{K}_{1x}=\vec{K}_{2x}, \vec{K}_{1y}=-\vec{K}_{2y}, \vec{K}_{3x}=\vec{K}_{4x}, \vec{K}_{3y}=\vec{K}_{4y},$$

moreover, vectors $\vec{K}_1, \vec{K}_2$ correspond to "+1" and "−1" diffraction orders of the second linear diffractive optical element of the in-coupling diffractive element, vector $\vec{K}_3$ corresponds to the second multiplying diffractive optical element, vector $\vec{K}_4$ corresponds to the first multiplying diffractive optical element, vector $\vec{K}_5$ corresponds to third linear diffractive optical element of the out-coupling diffractive element, vector $\vec{K}_6$ corresponds to first linear diffractive optical element of the in-coupling diffractive element, vector $\vec{K}_7$ corresponds to second linear diffractive optical element of the out-coupling diffractive element, and vector $\vec{K}_8$ corresponds to first linear diffractive optical element of the out-coupling diffractive element.

All the diffractive elements are applied to one side of the waveguide. The first and second sets of diffractive elements are located on one side of the waveguide, and the third and fourth sets of diffractive elements are located on the opposite side of the waveguide.

In accordance with another aspect of the disclosure, a method for operation of the architecture of diffractive optical elements is provided. The method includes the stages at which: the radiation from the projector enters the input diffractive element, in which it is divided into the red component of the image, the blue component of the image and the green component of the image and is directed to the sets of diffractive elements operating simultaneously, while the first set of diffractive elements operates as follows: the green component of the image enters on the first linear diffractive optical element of the in-coupling diffractive element, then enters the output diffractive element, where radiation is multiplied by the first linear diffractive optical element of the out-coupling diffractive element, and is output to the user's eye using the second linear diffractive optical element of the output diffractive element, the blue component enters on the first linear diffractive optical element of the in-coupling diffractive element, on which that part of it diffracts, which propagates at an angle different from the angle of incidence of the green component, enters the out-coupling diffractive element, where multiplication occurs on the first linear diffractive optical element of the output diffractive element, and is output to the user's eye using the second linear diffractive optical element of the out-coupling diffractive element, the second set of diffractive elements operates as follows: the green component of the image enters on the first linear diffractive optical element of the in-coupling diffractive element, then enters the out-coupling diffractive element, where radiation is multiplied by the second linear diffractive optical element of the out-coupling diffractive element, and is output to the user's eye using the first linear diffractive optical element of the out-coupling diffractive element, the blue component enters on the first linear diffractive optical element of the in-coupling diffractive element, on which that part of it diffracts, which propagates at an angle different from the angle of incidence of the green component, enters the out-coupling diffractive element, where multiplication occurs by the second linear diffractive optical element of the out-coupling diffractive element, and is output to the user's eye using the first linear diffractive optical element of the out-coupling diffractive element the third set of diffractive elements operates as follows: the green component enters the second linear diffractive optical element of the in-coupling diffractive element, then enters the first multiplying diffractive element, where multiplication occurs, after which it enters the third linear diffractive optical element of the out-coupling diffractive element and is output to the user's eye, the red component enters the second linear diffractive optical element of the in-coupling diffractive element, on which that part of it diffracts, which propagates at an angle different from the angle of incidence of the green component, then enters the first multiplying diffractive element, where multiplication takes place, and then enters into the third linear the diffractive optical element of the output diffractive element and is output to the user's eye, the fourth set of diffractive elements operates as follows: the green component enters the second linear diffractive optical element of the in-coupling diffractive element, then enters the second multiplying diffractive element, where multiplication occurs, after which it enters the third linear diffractive optical element of the out-coupling diffractive element and is output to the user's eye, the red component enters on the second linear diffractive optical element of the in-coupling diffractive element, on which diffracted is part propagates at an angle different from the angle of incidence of the green component, then enters the second multiplying diffractive element, where multiplication occurs, and then enters into the third linear the diffractive optical element of the out-coupling diffractive element and is output to the user's eye.

In accordance with another aspect of the disclosure, a method for operation of the architecture of diffractive optical elements is provided. The method includes the stages at which the radiation from the projector enters the input diffractive element, in which it is divided into the red component of the image, the blue component of the image and the green component of the image and is directed to the sets of diffractive elements operating simultaneously, while the first set of diffractive elements operates as follows green upper component enters on the first linear diffractive optical element of the in-coupling diffractive element, then enters the out-coupling diffractive element, where radiation is multiplied by the first linear diffractive optical element of the out-coupling diffractive element, and is output to the user's eye using the second linear diffractive optical element of the out-coupling diffractive element, the blue upper component enters on the first linear diffractive optical element of the in-coupling diffractive element, on which that part of it diffracts, which propagates at horizontal angle different from the angles of incidence of the green component, enters into the output diffractive element, where multiplication occurs on the first linear diffractive element of the output diffractive element, and is input in the user's eye using the second linear diffractive element of the out-coupling diffractive element, the red upper component enters on the first linear diffractive optical element of the in-coupling diffractive element, on which that part of it diffracts, which propagates at a horizontal angle different from the angles of incidence of the green component and the blue component, enters the output diffractive element, where multiplication occurs by the first linear diffractive element of the out-coupling diffractive element, and is output to the eye of the user by means of the second linear diffractive optical element of the out-coupling diffractive element, the second set of diffractive elements operates as follows the green lower component enters on the first linear diffractive optical element of the in-coupling diffractive element, then enters the output diffractive element, where multiplication occurs on the second linear diffractive optical element of the out-coupling diffractive element, and is output into the user's eye using the first linear diffractive optical element of the output diffractive element, the red upper component enters on the first linear diffractive optical element of the in-coupling diffractive element, on which that part of it diffracts, which propagates at a horizontal angle different from the angles of incidence of the green component and the blue component, enters the output diffractive element, where multiplication occurs by the first linear diffractive element of the out-coupling diffractive element, and is output to the eye of the user by the second linear diffractive optical element of the out-coupling diffractive element, the red lower component enters on the first linear diffractive optical element of the input diffractive element, on which that part of it diffracts, which propagates at a horizontal angle different from the angles of incidence of the green component and the blue component, enters the output diffractive element, where multiplication occurs on the second linear diffractive the optical element of the output diffractive element, and is output to the user's eye by the first linear diffractive optical element of the output diffractive element, the third set of diffractive elements operates as follows: the green central upper component enters on the second linear diffractive optical element of the in-coupling diffractive element, then enters into the first multiplying diffractive element, where multiplication occurs, after which it enters the third linear diffractive optical element of the out-coupling diffractive element and is output to the user's eye, the red central upper component enters on the second linear diffractive optical element of the in-coupling diffractive element, on which diffracted is part propagates at a horizontal angle different from the angles of incidence of the green component, then enters the first multiplying diffractive element, where multiplication takes place, and then gets into the third linear diffractive optical element of the out-coupling diffractive element and output to the user's eye, the blue central upper component enters on the second linear diffractive optical element of the in-coupling diffractive element, on which that part of it diffracts, which propagates at a horizontal angle different from the angles of incidence of the green component and the red component, then enters into the first multiplying diffractive element, where multiplication takes place, after which it enters the third linear diffractive optical element of the out-coupling diffractive element and is displayed in the user's eye, the fourth set of diffractive elements operates as follows: the green central lower component enters the second linear diffractive optical element of the in-coupling diffractive element, then enters the second multiplying diffractive element, where multiplication occurs, and then enters the third linear diffractive optical element of the out-coupling diffractive element and is output to the user's eye, the red central lower component enters on the second linear diffractive optical element of the in-coupling diffractive element, on which diffracted is part propagates at a horizontal angle different from the angle of incidence of the green component, then enters on the second multiplying diffractive element, where multiplication takes place, and then enters on the third linear diffractive optical element of the out-coupling diffractive element and output to the user's eye, the blue central lower component enters on the second linear diffractive optical element of the in-coupling diffractive element, on which that part of it diffracts, which propagates at a horizontal angle different from the angles of incidence of the green component and the red component, then enters on the second multiplying diffractive element, where multiplication takes place, after which it enters on the third linear diffractive optical element of the out-coupling diffractive element and is output to the user's eye.

In accordance with another aspect of a disclosure, a device for displaying an augmented reality is provided. The device includes an image projector, a waveguide containing the proposed architecture of diffractive optical elements.

In accordance with another aspect of a disclosure, a device for displaying augmented reality is provided. The device includes an image projector, the first waveguide containing the proposed architecture of diffractive optical elements, operating to expand the horizontal field of view and eliminate the dispersion of the image, the second waveguide containing the proposed architecture of diffractive optical elements, operating to expand the vertical field of view.

In accordance with another aspect of a disclosure, a device for displaying augmented reality is provided. The device includes an image projector, a waveguide containing the proposed architecture of diffractive optical elements, the first and second sets of diffractive elements are located on one side of the waveguide, the third and fourth sets of diffractive elements are located on the opposite side of the waveguide.

In accordance with another aspect of a disclosure, a device for displaying an augmented reality is provided. The device includes an image projector, at least one waveguide containing at least one proposed architecture of diffractive optical elements.

In accordance with another aspect of a disclosure, augmented reality glasses containing an element for the left eye and an element for the right eye, and each of the elements for the left and right eyes is a device for displaying an augmented reality is provided, wherein a waveguide including a diffractive optical element architecture is located in each of the right-eye element and the left-eye element such that the out-coupling diffractive element is located opposite the user's eye.

In accordance with another aspect of a disclosure, augmented reality glasses containing an element for the left eye and an element for the right eye, and each of the elements for the left and right eyes is a device for displaying an augmented reality is provided, wherein the first and second waveguides are disposed in each of the right-eye element and the left-eye element such that the out-coupled diffractive elements are located opposite the user's eye.

In accordance with another aspect of the disclosure, a narrow pitch interval and a wide viewing angle by mounting a substrate, in which a thin film transistor circuit is provided and an inorganic light emitting diode is mounted on an upper surface of the substrate, to a module substrate, and it is possible to facilitate circuit inspection and replacement and manufacturing process.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The same reference numerals are used to represent the same elements throughout the drawings.

DETAILED DESCRIPTION

Figure 1:
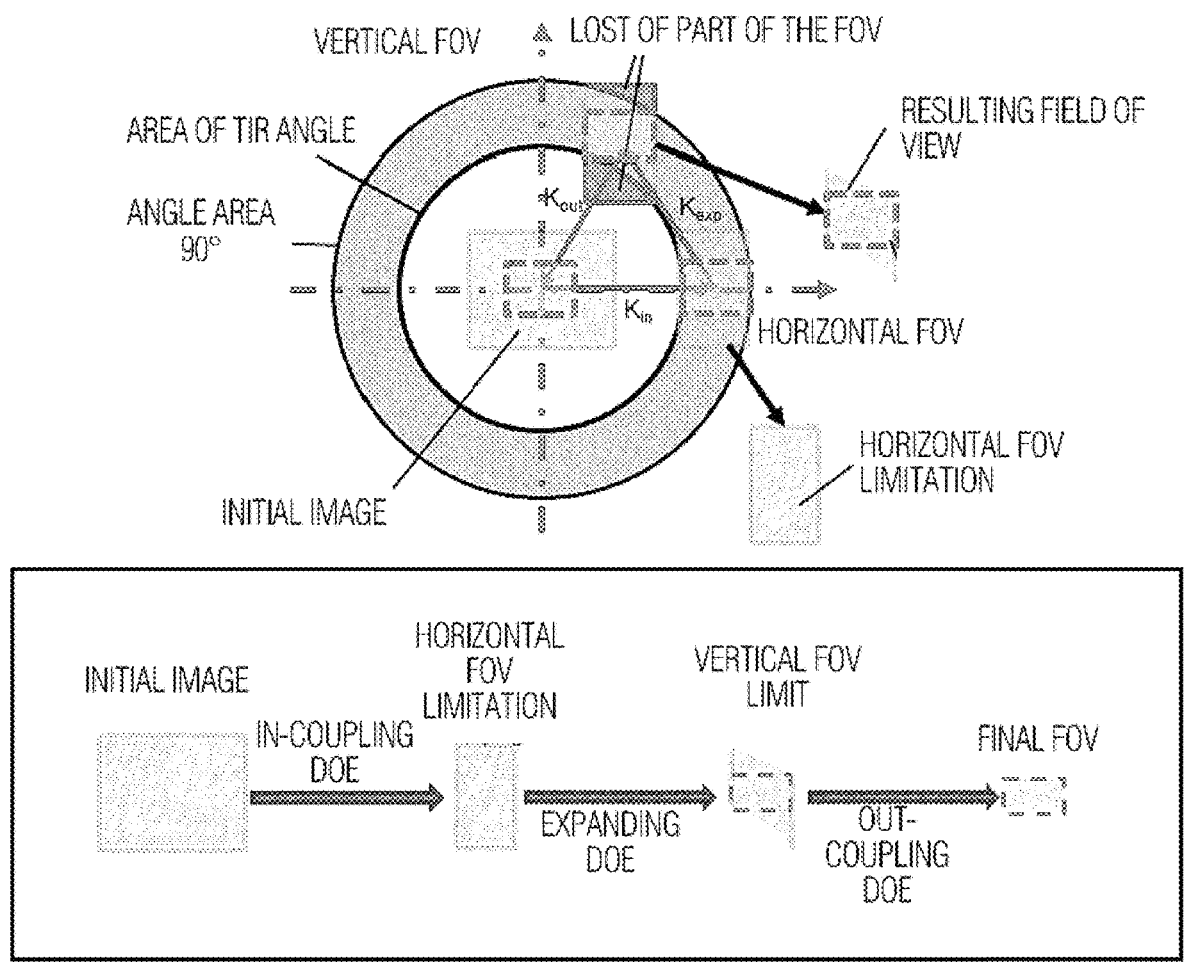
FIG. 1 schematically illustrates a limitation of a field of view when using a set of diffractive optical elements according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The proposed augmented reality device with a wide field of view and augmented reality glasses, implemented on the basis of the proposed device. The disclosure includes a waveguide including a diffractive architecture that is a structure of diffractive optical elements. The diffractive architecture (structure) includes four different sets of diffractive optical elements. Diffractive optical elements are diffractive gratings and will be referred to hereinafter as "diffractive elements" for convenience. The set of diffractive optical elements contains three diffractive elements, namely, an in-coupling diffractive element, multiplying the diffractive element, and an out-coupling diffractive element. Each set of diffractive elements is designed in such a way that it displays its own part of the augmented reality image. The output optical element produces an output of the image from different diffractive elements.

The proposed disclosure is aimed at reducing the overall dimensions of the augmented reality device, the proposed disclosure solves the problem of color dispersion, since each pair of sets of diffractive elements may conduct differently colored parts of the image that will not overlap each other. That is, thanks to the proposed disclosure, when using only one waveguide, a wide and full-color field of view is provided.

In order for a device based on diffractive elements (holographic (HOE) or diffractive (DOE)) to operate and display an image in the human eye, the picture transmitted from the projector must interact alternately with at least three linear diffraction gratings, namely with the in-coupling diffraction grating, multiplying diffraction grating and out-coupling diffraction grating.

The vector of the diffraction grating is the wave vector of the diffraction grating directed perpendicularly to the grating lines and located in the same plane with its operating surface. If we consider the grating data as vectors of these lattices, then, in order to obtain an undistorted image, the vectors of these three diffraction lattices must form a closed two-dimensional figure, that is, the sum of all vectors must be zero. In a case in which the sum of the vectors is not zero, then the image will be transmitted with distortion. In a case in which three vectors do not form a two-dimensional figure, then the input wide field of view at the output turns into a narrow picture, which is not quite comfortable to view, since in a case in which the pupil of the eye looks forward, only the central field of the image is clearly visible, while the parts of the image located at, represent a dark area, and in a case in which the pupil of the eye is displaced in the vertical direction, then on the contrary, the central part will appear as a dark area. That is, in the known classical systems, the user may see only a narrow strip of the image. Since it is initially assumed that the dimensions of the transmitted image coincide with the field of view of the waveguide, the field of view coincides with the field of the image.

The waveguide architecture proposed in the disclosure allows an increase in the width of the field of view.

Figure 2:
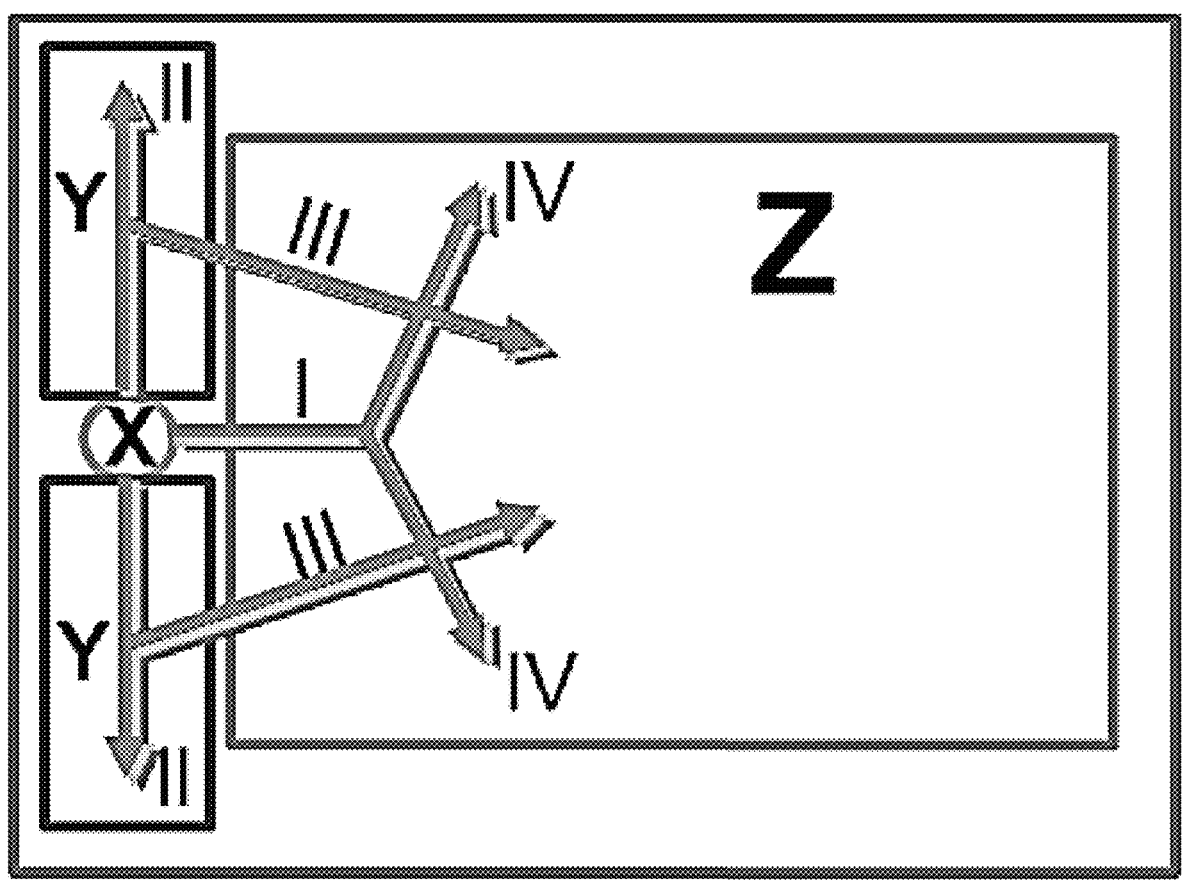
FIG. 2 illustrates the architecture of a proposed waveguide with division into zones X, Y and Z according to an embodiment of the disclosure.

FIG. 2 illustrates an architecture of a proposed waveguide with division into diffractive elements X, Y and Z according to an embodiment of the disclosure.

Referring to FIG. 2, X is an in-coupling diffractive element. The in-coupling diffractive element X includes two linear optical elements. The two Y diffractive elements are multiplying diffractive elements. Out-coupling diffractive element Z—is a diffractive element where both radiation multiplication and radiation output are provided. Out-coupling diffractive element Z includes three linear diffractive optical elements.

Arrows show the path of radiation inside the waveguide. Beams I and II are introduced by the in-coupling diffractive element X. Beam I interacts with the out-coupling diffractive element Z and is multiplied in it into beams IV. Beams II enter on the multiplying diffractive elements Y, where they are multiplied into beams III, which exit from the multiplying diffraction gratings Y and enter the output diffractive element Z. Beams III and IV are output from the out-coupling diffractive element Z.

In-coupling diffractive element X includes two linear optical elements. Moreover, the in-coupling diffractive element X is designed in such a way that one of the linear diffractive optical elements introduces radiation towards the output diffractive element Z, using one diffraction order, and the other of the linear diffractive elements introduces radiation towards the multiplying diffractive elements Y, using as "+1 "Diffraction order" and "−1" diffraction order. The radiation that is introduced towards the out-coupling diffractive element Z differs from the radiation that is introduced towards the multiplying diffractive element Y, that is, these are different parts of the field of view. This means that one part of the field of view is introduced towards the multiplying diffractive elements Y, and another part of the field of view is introduced towards the out-coupling diffractive element Z. These parts propagate inside the waveguide at different angles.

The out-coupling diffractive element Z outputs radiation from four different diffractive elements: from two linear optical elements of the output diffractive element Z and from two multiplying diffractive elements Y.

Figure 3:
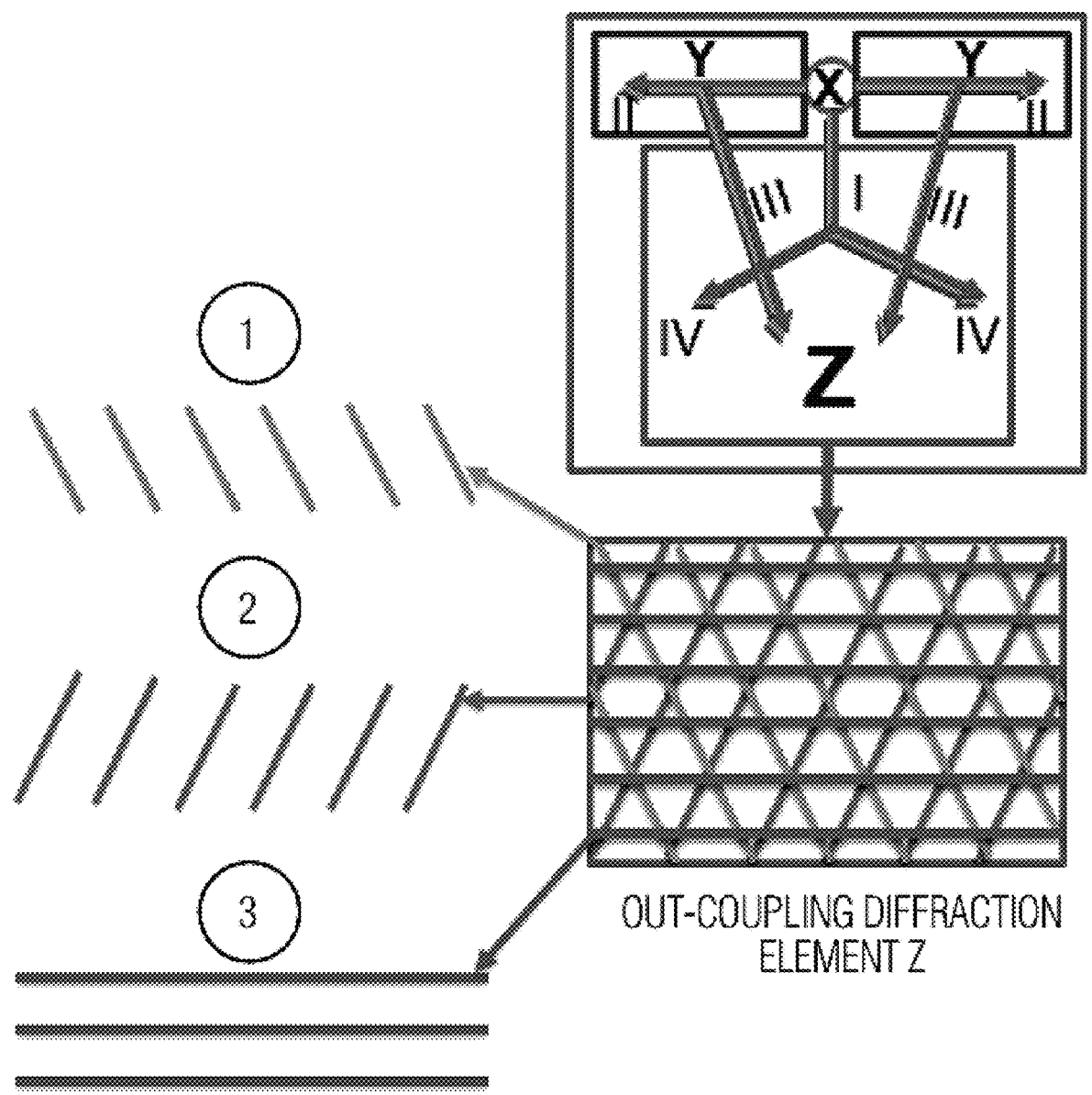
FIG. 3 schematically illustrates a proposed architecture of diffractive elements and an implementation of an output diffractive element Z of three linear diffractive optical elements according to an embodiment of the disclosure.

FIG. 3 schematically illustrates the proposed architecture of the diffractive elements and the implementation of the output diffractive element Z of three linear diffractive optical elements according to an embodiment of the disclosure.

Referring to FIG. 3 out-coupling diffractive element Z contains three linear diffractive optical elements (1, 2 and 3).

The radiation transmitted from the first and second multiplying diffractive elements Y enters the out-coupling diffractive element Z and is outputted by the third linear diffractive optical element 3 of the out-coupling diffractive element Z. Moreover, the vector of the third diffractive optical element 3 is directed towards the in-coupling diffractive element X.

One part of the radiation corresponding to the upper part of the image field directed from the zone X towards the zone Z is multiplied on the first linear diffractive optical element 1 of the out-coupling diffractive element Z and is outputted on the second linear diffractive optical element 2 of the out-coupling diffractive element Z, the second part of the radiation corresponding to the lower part of the image field directed from zone X towards zone Z is multiplied on the second linear diffractive optical element 2 and is outputted on the first linear diffractive optical element 1 of the out-coupling diffractive element Z. Thus, the out-coupling diffractive element Z (zone Z) is multiplying and outputting radiation from multiplying and outputting linear diffractive optical elements:

The principle of operation of diffractive optical elements operating for multiplication is known to be as follows. The beam propagating inside the waveguide enters on the multiplying diffractive element and part of the radiation of this beam is diffracted by the multiplying diffractive element, forming diffraction orders, in this case the "+1" diffraction order is considered. A beam that passed without diffraction continues to propagate along its original path, and after re-reflection from the planes of the waveguide again enters on the multiplying diffraction element, and part of the radiation of this beam is again diffracted by the multiplying grating, forming a "+1" diffraction order. Then the situation is repeated many times. The first diffracted and the second diffracted beams are parallel to each other, but propagate at a fixed distance from each other. Thus, from one beam, many parallel beams are obtained, that is, reproduction occurs.

Consider the sets of diffractive elements, which, according to the proposed disclosure, operate to display separate parts of the image (field of view) during the operation of the proposed waveguide architecture.

The set 1 of diffractive elements consists from the first linear diffractive optical element of the in-coupling diffractive element X, and also the first and second linear diffractive elements of the out-coupling diffractive element Z.

The set 2 of diffractive elements consists from the first linear diffractive optical element of the in-coupling diffractive element X, and also the second and first linear diffractive optical elements of the out-coupling diffractive element Z.

The set 3 of the diffractive elements consists of a second linear diffractive optical element of the in-coupling diffractive element X of the first multiplying diffractive optical element Y and the third linear diffractive optical element of the out-coupling diffractive element Z.

The set 4 of the diffractive elements consists of a second linear diffractive optical element of the in-coupling diffractive element X of the second multiplying diffractive optical element Y and the third linear diffractive optical element of the out-coupling diffractive element Z.

Figure 4:
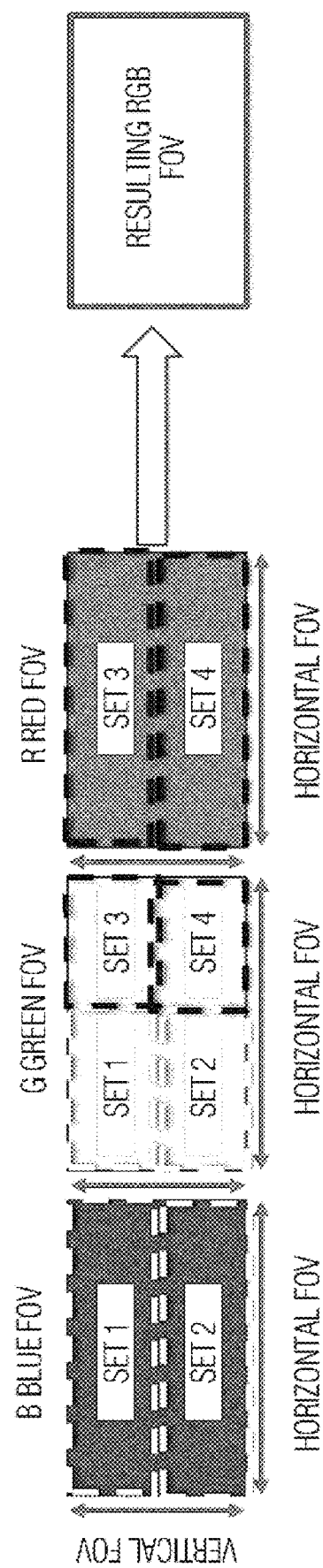
FIG. 4 illustrates a light separation of an entire field of view across sets of diffractive optical elements in a case of horizontal expansion of a field of view according to an embodiment of the disclosure.

FIG. 4 illustrates a light separation of an entire field of view across sets of diffractive optical elements in a case of horizontal expansion of a field of view according to an embodiment of the disclosure.

Referring to FIG. 4, light separation of the entire field of view by sets of diffractive elements is implemented as follows. Odd sets 1 and 3 of the diffractive elements are responsible for the upper part of the field of view. Even sets 2 and 4 of the diffractive elements are responsible for the upper part of the field of view. Sets 1 and 2 of diffractive elements spend the entire blue part of the field of view and half of the green part of the field of view. Sets 3 and 4 of diffractive elements spend the entire red part of the field of view and half of the green part of the field of view.

Four sets of diffractive elements are used on a single waveguide to increase the width of the field of view by partially separating different sets of diffractive elements in straight space. It should be noted that in the context of this application, the terms "straight space" and "angular space" define the coordinate grid in which the analysis/calculation is performed. In straight space, the coordinate grid is defined by spatial coordinates (x, y and z directions). In angular space, the grid is defined by angular coordinates (for example Ax, Ay and Az). The proposed disclosure takes into account not only the direction of propagation of radiation (i.e., angular space), but also those places inside the waveguide where this radiation propagates (i.e., straight space). To prevent mixing of all parts of the image field, it is necessary that at each specific point in space inside the waveguide one point on the grid of angular coordinates occupies no more than one part of the transmitted image. This may be achieved by strictly prohibiting the use of more than one part of the transmitted image at the same point on the grid of angular coordinates, this approach is widely used in the prior art. In the disclosure, the same point on the grid of angular coordinates may occupy more than one part of the transmitted image, since different parts of the transmitted image occupy the same point on the grid of angular coordinates in different places inside the waveguide, that is, they are separated in direct space.

Figure 5A:
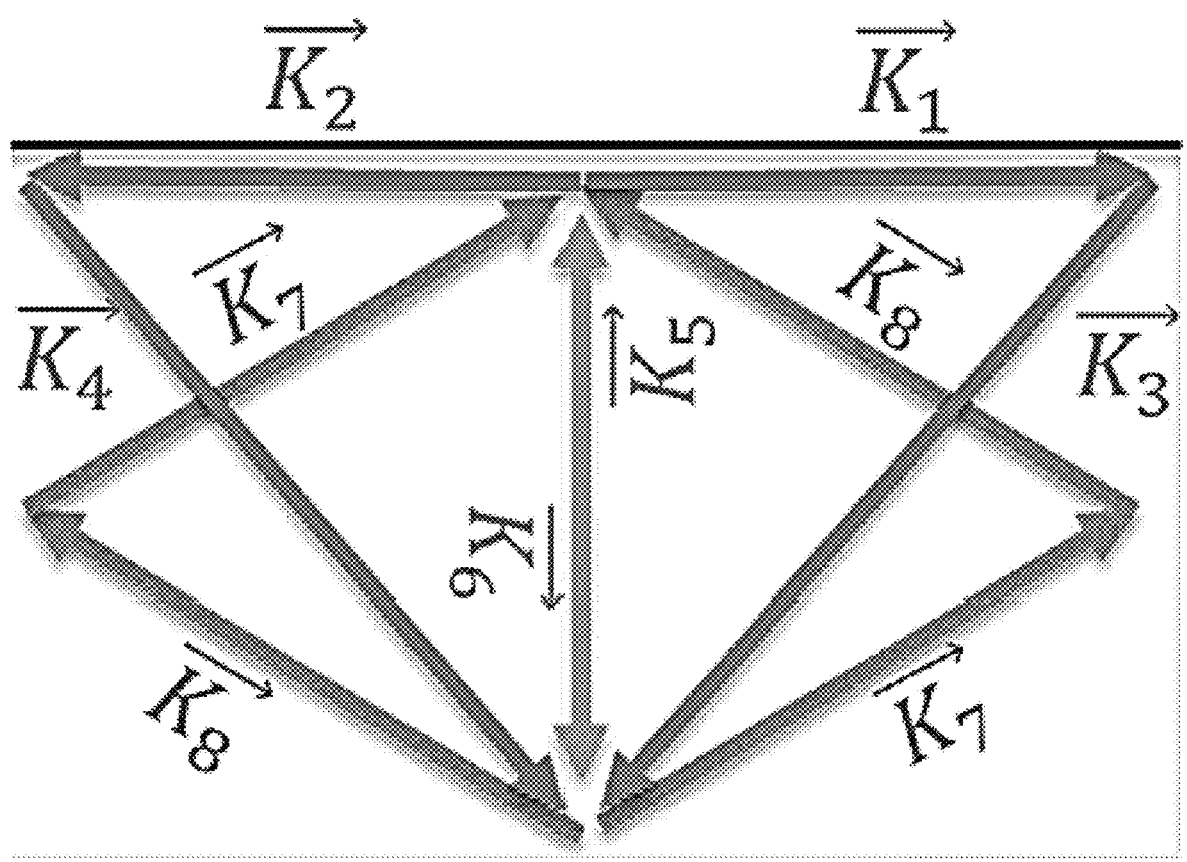
FIG. 5A illustrates a vector diagram of a proposed diffractive element architecture according to an embodiment of the disclosure.

FIG. 5A illustrates a vector diagram of a proposed diffractive element architecture according to an embodiment of the disclosure.

Figure 5B:
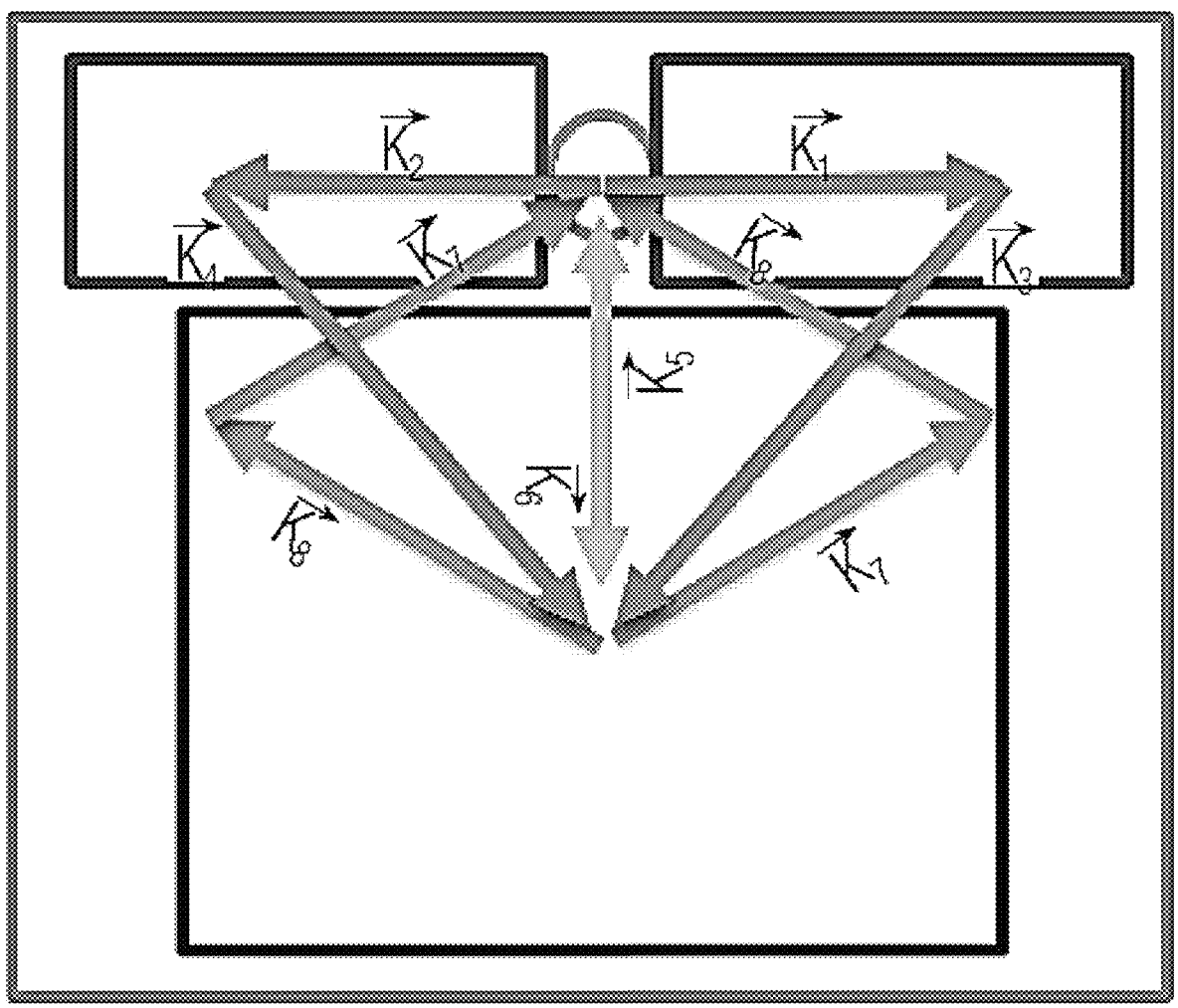
FIG. 5B illustrates the overlay of a vector diagram on an architecture of diffractive optical elements according to an embodiment of the disclosure.

FIG. 5B illustrates an overlay of a vector diagram on an architecture of diffractive optical elements according to an embodiment of the disclosure.

Referring to FIGS. 5A and 5B, he $\vec{K}_1$ $\vec{K}_2$ $\vec{K}_6$ vectors, correspond to linear diffractive optical elements of the input diffractive element X.

Vectors $\vec{K}_3$ $\vec{K}_4$ corresponding to multiplying diffractive optical elements Y.

The $\vec{K}_5$ $\vec{K}_7$ $\vec{K}_8$ vectors, correspond to the out-coupling diffractive element Z.

Vectors $\vec{K}_1$, $\vec{K}_2$ correspond to "+1" and "−1" diffraction orders of the second linear diffractive optical element of the in-coupling diffractive element X. The vector $\vec{K}_6$, corresponds to the first linear diffractive optical element of the in-coupling diffractive element X. The $\vec{K}_3$ vector corresponds to the second multiplying diffractive element Y. The $\vec{K}_4$ vector corresponds to the first multiplying diffractive element Y. The $\vec{K}_8$ vector corresponds to the first linear diffractive optical element of the out-coupling diffractive element Z. The vector $\vec{K}_7$ corresponds to the second linear diffractive optical element of the out-coupling diffractive element Z. The vector $\vec{K}_5$ corresponds to the third linear diffractive optical element of the out-coupling diffractive element Z.

The above-mentioned sets of diffractive elements operate simultaneously. Radiation from the projector enters on the in-coupling diffractive optical element X in which it is divided at different angles into red, green and blue components.

The set 1 of diffractive elements operates as follows.

The green component of the image enters on the first linear diffractive optical element of the in-coupling diffractive element X, then enters the out-coupling diffractive element Z, where radiation is multiplied by the first linear diffractive optical element of the out-coupling diffractive element Z, and is output to the user's eye using the second linear diffractive optical element of the out-coupling diffractive element Z.

The blue component enters on the first linear diffractive optical element of the in-coupling diffractive element X, on which diffracted is part of it that propagates in air at an angle different from the angle of incidence of the green component. It enters on the out-coupling diffractive element Z, where multiplication occurs on the first linear diffractive optical element of the out-coupling diffractive element Z, and is output into the user's eye using the second linear diffractive optical element of the out-coupling diffractive element Z.

The set 2 of diffractive elements operates as follows.

The green component enters on the first linear diffractive optical element of the in-coupling diffractive element X, then enters the out-coupling diffractive element Z, where radiation is multiplied by the second linear diffractive optical element of the out-coupling diffractive element Z, and is output to the user's eye using the first linear diffractive optical element of the out-coupling diffractive element Z.

The blue component enters on the first linear diffractive optical element of the in-coupling diffractive element X, on which diffracted is part of it that propagates in air at an angle different from the angle of incidence of the green component. It enters on the out-coupling diffractive element Z, where multiplication occurs on the second linear diffractive optical element of the out-coupling diffractive element Z, and is output to the user's eye using the first linear diffractive optical element of the out-coupling diffractive element Z.

The set 3 of diffractive elements operates as follows.

The green component enters the second linear diffractive optical element of the in-coupling diffractive element X, then enters the first multiplying diffractive element Y, where multiplication occurs, after which it enters the third linear diffractive optical element of the out-coupling diffractive element Z and is output to the user's eye.

The red component enters on the second linear diffractive optical element of the input diffractive element X, on which diffracted is that part of it, that propagates in air at an angle different from the angle of incidence of the green component. Then it enters on first multiplying diffractive element Y, where multiplication takes place, after which it enters the third linear diffractive optical element of the out-coupled diffractive element Z and is output to the user's eye.

The set 4 of diffractive elements operates as follows.

The green component enters on the second linear diffractive optical element of the in-coupling diffractive element X, then enters on the second multiplying diffractive element Y, where multiplication occurs, after which it enters the third linear diffractive optical element of the out-coupling diffractive element Z and is output to the user's eye.

The red component enters on the second linear diffractive optical element of the input diffractive element X, on which diffracted is that part of it, that propagates in air at an angle different from the angle of incidence of the green component. Then it enters on the second multiplying diffractive element Y, where multiplication takes place, after which it enters on the third linear diffractive optical element of the out-coupling diffractive element Z and is output to the user's eye.

It should be noted that the input diffractive element X consists of at least two linear diffraction gratings (i.e., the first and second linear diffractive optical elements of the in-coupling diffractive element X). The first linear diffractive optical element of the in-coupling diffractive element X introduces radiation towards the out-coupling diffractive element Z, while two parts of the green image are introduced at once, which are then separated during multiplication on the corresponding linear diffractive elements of the out-coupling diffractive element Z. The second linear diffractive optical element of the in-coupling diffractive element X introduces two other parts of the green image towards the first and second multiplying diffractive elements Y, respectively. This separation is achieved by choosing the parameters of the diffraction gratings, namely, the choice of the spatial frequency (period) and orientation.

That is, which color components interact with the corresponding diffractive elements is determined by the spatial frequency (period) of the diffraction gratings. In the case of the in-coupling diffractive element X, the first linear diffractive optical element of the in-coupling diffractive element X has a higher spatial frequency (i.e., a shorter period) than the second linear diffractive optical element of the in-coupling diffractive element X. Thus, the blue component diffracts into the waveguide mode on the first linear the diffractive optical element of the in-coupling diffractive element X, and the red one is on the second one. The green component is between red and blue in the spectrum, therefore, it is divided between the first and second linear diffractive elements of the in-coupling diffractive element X as shown in FIG. 4.

To prevent mixing of all parts of the image field, it is necessary that at each specific point in space inside the waveguide one point on the grid of angular coordinates occupies no more than one part of the transmitted image. This may be achieved by strictly prohibiting the use of the same point on the grid of angular coordinates for more than one part of the transmitted image, and such techniques are known from the prior art.

Figure 6:
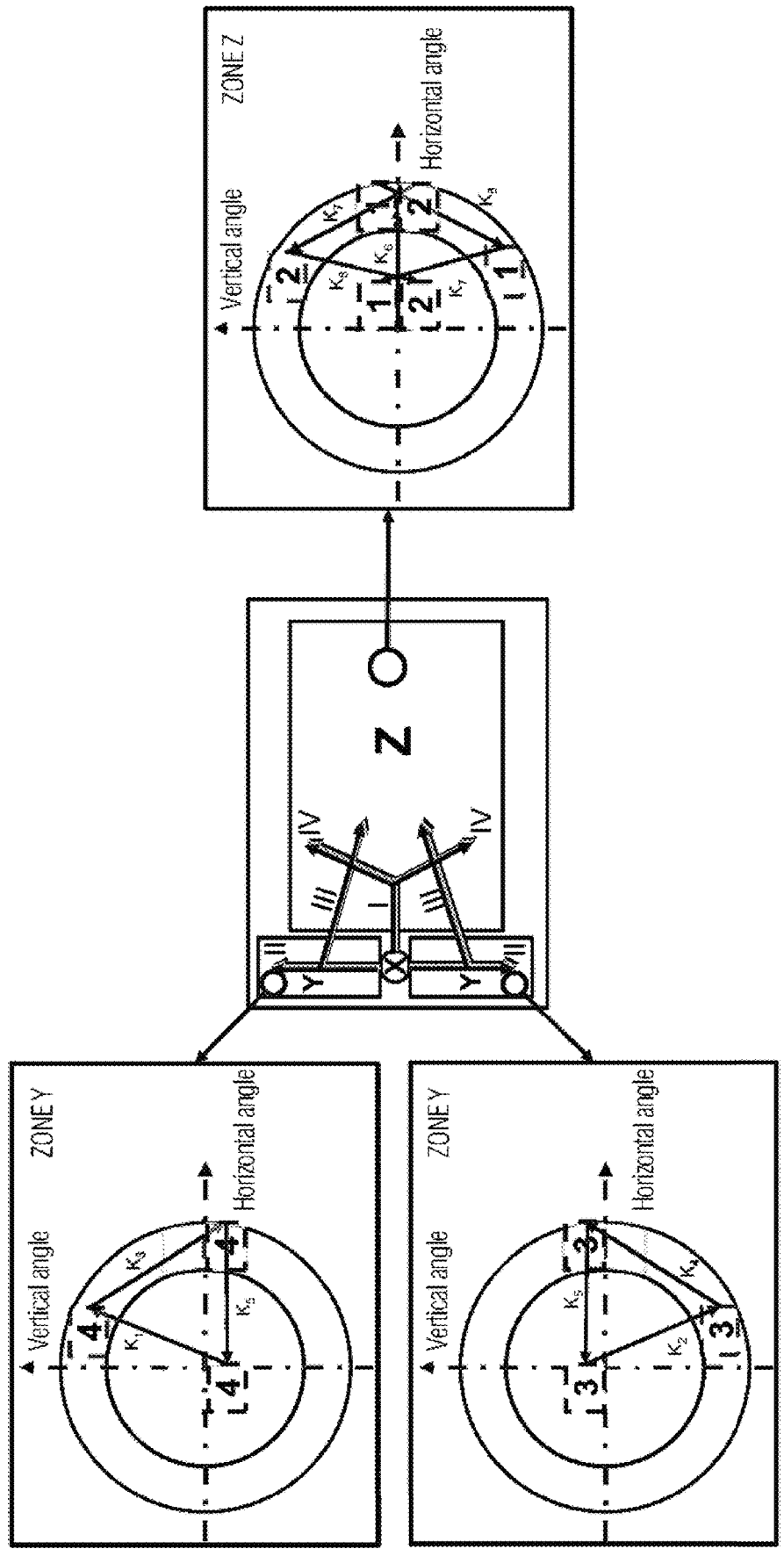
FIG. 6 illustrates the arrangement of portions of a transmitted image in a waveguide during image propagation according to an embodiment of the disclosure.

FIG. 6 illustrates the arrangement of portions of the transmitted image in the waveguide during image propagation according to an embodiment of the disclosure.

It should be noted that in the disclosure, the same point on the grid of angular coordinates may occupy more than one part of the transmitted image, since, referring to FIG. 6, different parts of the transmitted image occupy the same point on the grid of angular coordinates in different places inside the waveguide (they are separated in direct space). FIG. 6 shows a coordinate grid of angular for each of the zones of the corner space (zone Z on the right, zone Y at the top, zone Y at the bottom). In zone Z, the upper diagonal quarter of the angular space is occupied by a part of field 2, that is, the image field, for which a set 2 diffractive elements is responsible. In zone Z, the upper diagonal quarter of the angular space is occupied by a part of field 1, that is, the image field, for which a set 1 diffractive elements is responsible. At the same time, in zones Y, the lower and upper diagonal quarters remain free from parts of the image field, for which 1 and 2 sets of diffractive elements are responsible, respectively, therefore, in the upper zone Y, the upper diagonal quarter is occupied by part of field 4, that is, the image field, for which a set 4 diffractive elements is responsible.

In the lower zone Y, the lower diagonal quarter is occupied by part of field 3, that is, the image field, for which a set of 3 diffractive elements is responsible. In this case, the parts of the image for which sets 1 and 3 of the diffractive elements are responsible do not mix with each other, parts 2 and 4 also do not mix with each other. This happens because the same parts of the angular space are occupied in the waveguide at different points of the direct (local, coordinate) space.

That is, in other words, the radiation that is transmitted through sets 1 and 2 does not propagate inside the waveguide in the places where the multiplying diffractive elements Y are located, that is, the angular components occupied by sets 1 and 2, for example, in the zone where the out-coupling diffractive element Z may be used by sets 3 and 4 in the zones where the multiplying diffractive elements Y are located. Thus, the Y zone and the Z zone use the same angular components to operate different sets of gratings. Thus, the sets of diffraction gratings are separated in direct space, which makes it possible to use in one waveguide not two, but four sets of diffraction gratings, where each set of diffraction gratings transmits a separate part of the field of view, that is, it is possible to conduct a field of view twice as large as in the known prior art, since known from the prior art are only solutions having two or less sets of diffractive elements on one waveguide. Since each set of diffractive elements conveys a fixed angular size of the field of view, doubling the number of sets of diffractive elements on the waveguide doubles the field of view.

It should be emphasized that different parts of the field of view do not interact with each other in the waveguide due to the proposed arrangement of the diffractive elements.

The radiation that is introduced by the second linear diffractive optical element of the input diffractive element X towards the first and second multiplying diffractive elements Y, respectively, may propagate at any angles, since the radiation that is introduced by the first linear diffractive optical element of the input diffractive element X toward the output diffractive element Z does not apply in places where multiplying diffractive elements Y occurs.

Each of the sets is responsible for conducting different parts of the field of view, not only in angle, but also in color. Each pair of sets of diffractive elements provides different colored horizontal portions of the field of view, increasing the resulting horizontal viewing angle. Thus, the user may see a full color image, while only one waveguide is used. Each point of the field of view is determined by three variables: angular coordinates horizontally (Ax) and vertical (Ay), as well as color (R, G, B). Thus, three points of the field of view (Ax, Ay, R; Ax, Ay, G; Ax, Ay, and B) correspond to a certain point on the grid of angular coordinates with coordinates Ax and Ay. The division of the field of view into sets occurs not only by angular coordinates, but also by color.

The waveguide is designed in such a way that the radiation that interacts with sets 1 and 2 does not interact with sets 3 and 4, for the green part of the field of view, one half of the field of view interacts with sets 1 and 2, with sets 3 and 4—the second half of the field of view. Therefore, it is possible to display for viewing to the user different spectral-angular parts of the field of view, and the chromatic dispersion is compensated.

The waveguide is designed by means of the parameters of the diffractive elements, namely, through the spatial orientation of the diffractive elements and the spatial period of the diffractive elements, which are described by the vector of the diffractive optical element.

The parameters of all diffractive elements on the waveguide are determined from the following system of equations:

Equation 3

$$\begin{cases} \left|\overrightarrow{k_{\lambda_b,\theta,\delta}} - \overrightarrow{K_5}\right| = \dfrac{2\pi n_{\lambda_b}}{\lambda_b} \\ \left|\overrightarrow{k_{\lambda_g,\ldots\,\theta,0}} + \overrightarrow{K_6}\right| = \dfrac{2\pi}{\lambda_g} \\ \left|\overrightarrow{k_{\lambda_g,\theta,0}} + \overrightarrow{K_5} + \overrightarrow{K_6}\right| = \dfrac{2\pi}{\lambda_g} \\ \left|\overrightarrow{k_{\lambda_r,\theta,0}} - \overrightarrow{K_7}\right| = \dfrac{2\pi n_{\lambda_r}}{\lambda_r} \\ \left|\overrightarrow{k_{\lambda_b,\theta,0}} + \overrightarrow{K_1}\right| = \dfrac{2\pi n_{\lambda_b}}{\lambda_b} \\ \left(\overrightarrow{k_{\lambda_b,\theta,0}} + \overrightarrow{K_1}\right)_x = 0 \\ 0 = \min\left(\left|\overrightarrow{k_{\lambda_g,\ldots\,\theta,\delta}} - \overrightarrow{K_7}\right| - \dfrac{2\pi}{\lambda_g},\right. \\ \left.\left|\overrightarrow{k_{\lambda_b,\ldots\theta,\ldots\delta}} + \overrightarrow{K_1}\right| - \dfrac{2\pi}{\lambda_b}\right) \end{cases} \quad (1)$$

Vectors $\overrightarrow{K_1}$-$\overrightarrow{K_8}$ are vectors of linear diffractive elements as described above.

Vector $\overrightarrow{k_{l,x,y}}$ is the wave vector of an electromagnetic wave, defined by three coordinates l, x, y, where l is the length of the electromagnetic wave, x is the angular coordinate of the electromagnetic wave in the x direction, y is the angular coordinate of the electromagnetic wave in the y direction.

$n_{\lambda_b}$ is the refractive index of the optical system for the wavelength $\lambda_b$.

$n_{\lambda_g}$ is the refractive index of the optical system for the wavelength $\lambda_g$.

$n_{\lambda_r}$ is the refractive index of the optical system for the wavelength $\lambda_r$.

$\lambda_b$ is the length of the electromagnetic wave corresponding to blue.

$\lambda_g$ is the length of the electromagnetic wave corresponding to green.

$\lambda_r$ is the length of the electromagnetic wave corresponding to red.

θ is the maximum angle of the transmitted field of view in the x direction (the size of the field of view in the x direction is 2θ).

δ is the maximum angle of the transmitted field of view in the y direction (the size of the field of view in the y direction is 2δ).

The initial data for solving this system of equations are the used electromagnetic wavelengths ($\lambda_b$, $\lambda_g$, $\lambda_r$), the refractive indices of the optical system for the used wavelengths ($n_{\lambda_b}$, $n_{\lambda_r}$, $n_{\lambda_g}$) the aspect ratio of the sides of the field of view (θ/δ), as well as the geometric ratios of the vectors of linear elements arising from the geometric features of the waveguide architecture as seen from FIG. 5A.

$\overrightarrow{K_{5y}}=0$, $\overrightarrow{K_{6y}}=0$, $\overrightarrow{K_{7x}}=\overrightarrow{K_{8x}}$, $\overrightarrow{K_{1x}}=\overrightarrow{K_{2x}}$, $\overrightarrow{K_{1y}}=-\overrightarrow{K_{2y}}$, $\overrightarrow{K_{3x}}=\overrightarrow{K_{4x}}$, $\overrightarrow{K_{3y}}=\overrightarrow{K_{4y}}$, The solution of this system of equations makes it possible to determine the vectors $\overrightarrow{K_1}$-$\overrightarrow{K_8}$—vectors of linear diffractive elements, as well as the maximum angles of the transmitted field of view in the x and y directions (θΠδ)

That is, the required parameters of the diffractive elements may be calculated analytically.

Figure 8:
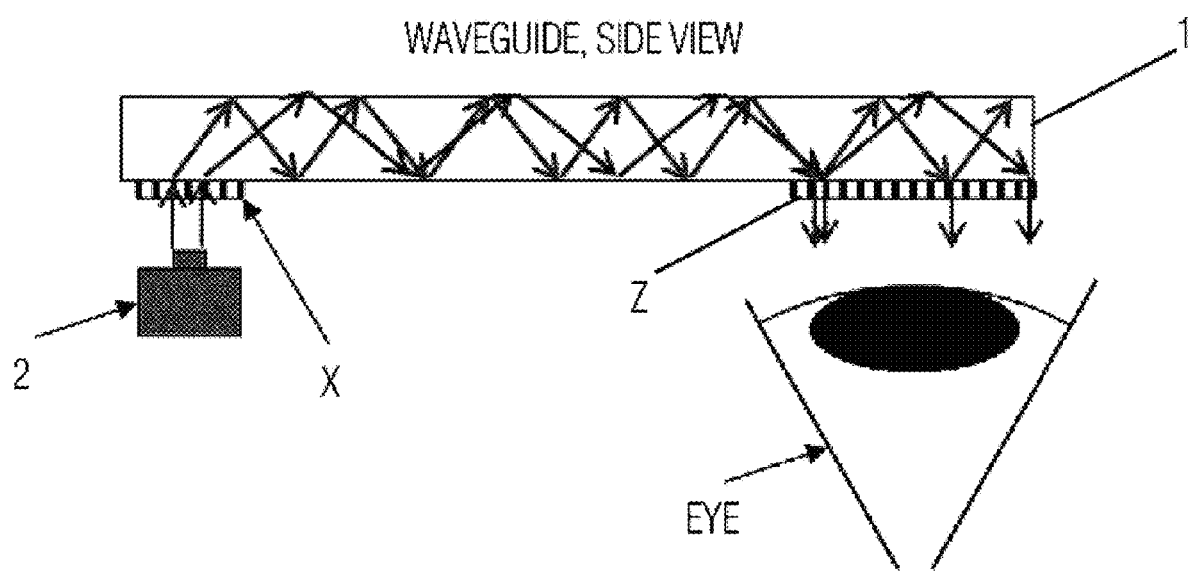
FIG. 8 schematically illustrates an augmented reality display system according to an embodiment of the disclosure.

FIG. 8 schematically illustrates an augmented reality display system according to an embodiment of the disclosure.

Referring to FIG. 8, the proposed system consists of at least one waveguide 1, which includes diffractive optical elements, a projector 2 that generates an image. Diffractive optical elements in the waveguide are an input diffractive optical element X, the first and second multiplying diffractive elements Y (not visible in the view shown in FIG. 8), and an out-coupling diffractive element Z, which both multiplies and outputs the image components into the user's eye.

The image generated by the projector 2 enters the architecture of the diffractive elements through the input diffractive element X, propagates through the architecture of the diffractive elements in the waveguide and exits the out-coupling diffractive element Z, entering the user's eye.

In one embodiment of the disclosure, the sets of diffractive elements are used not to compensate for the color dispersion of the image while simultaneously increasing the horizontal field of view, as described above, but to increase the vertical field of view. Compensating for the color dispersion of an image without increasing the vertical field of view allows to increase only the horizontal field of view.

If grating sets are designed differently, sets 1 and 2 will transmit the outermost parts of the vertical image, sets 3 and 4 will transmit more central parts. The design is carried out in accordance with the system of equations presented below.

How it operates: the parts of the image that are transmitted by sets 1 and 2 of the diffractive elements differ in vertical angular coordinates from the parts of the image that are transmitted by sets 3 and 4 of the diffractive elements. In total, these parts will give the largest vertical field of view, if we apply a system of equations to determine the parameters of linear diffractive elements:

In this case, the diffraction grating parameters are determined by the following system of equations:

Equation 4

$$\begin{cases} \left|\overrightarrow{k_{\lambda_\delta,\ldots\,\theta,0}} - \overrightarrow{K_5}\right| = \dfrac{2\pi}{\lambda_b} \\ \left|\overrightarrow{k_{\lambda_r,\theta,\delta}} - \overrightarrow{K_5}\right| = \dfrac{2\pi n_{\lambda_r}}{\lambda_r} \\ \left|\overrightarrow{k_{\lambda_r,\ldots\,\theta,0}} - \overrightarrow{K_5} + \overrightarrow{K_8}\right| = \dfrac{2\pi}{\lambda_r} \\ \left|\overrightarrow{k_{\lambda_r,\ldots\theta,\varphi}} - \overrightarrow{K_5} + \overrightarrow{K_8}\right| = \dfrac{2\pi n_{\lambda_r}}{\lambda_r} \\ \left|\overrightarrow{k_{\lambda_r,\theta,\psi}} - \overrightarrow{K_5} + \overrightarrow{K_8}\right| = \dfrac{2\pi n_{\lambda_r}}{\lambda_r} \\ \dfrac{2\pi}{\lambda_r} = \min\left(\left|\overrightarrow{k_{\lambda_r,\theta,\psi}} + \overrightarrow{K_2}\right|, \left|\overrightarrow{k_{\lambda_r,\ldots\,\theta,\varphi}} + \overrightarrow{K_2}\right|\right) \\ \left(\left|\overrightarrow{k_{\lambda_r,\ldots\,\theta,0}} + \overrightarrow{K_2}\right|\right)_x = 0 \\ \left|\overrightarrow{k_{\lambda_b,\theta,0}} + \overrightarrow{K_2}\right| = \dfrac{2\pi n_{\lambda_b}}{\lambda_0} \end{cases} \quad (2)$$

Vectors $\overrightarrow{K_1}$-$\overrightarrow{K_8}$ are vectors of linear diffractive elements as described above.

Vector $\overrightarrow{k_{l,x,y}}$ is the wave vector of an electromagnetic wave, defined by three coordinates l, x, y, where l is the length of the electromagnetic wave, x is the angular coordinate of the electromagnetic wave in the x direction, y is the angular coordinate of the electromagnetic wave in the y direction.

$n_{\lambda_b}$ is the refractive index of the optical system for the wavelength $\lambda_b$.

$n_{\lambda_r}$ is the refractive index of the optical system for the wavelength $\lambda_r$.

$\lambda_b$ is the length of the electromagnetic wave corresponding to blue.

$\lambda_r$ is the length of the electromagnetic wave corresponding to red.

$\varphi$ and $\psi$ are the angles within the field of view in the y direction, which are the sewing angles of sets 1, 2 and sets 3, 4. It is necessary to clarify that the stitching angle is understood as the angle of contact between the two parts of the field of view transmitted over different sets of diffraction gratings. That is, two adjacent parts of the field of view, transmitted through different sets of diffraction gratings, must either partially overlap each other, or touch each other so that the image is devoid of black spots—angular coordinates that no set within the field of view transmits. In most cases, two adjacent parts of the field of view partially overlap each other, and contact only at one point (this approach allows to achieve the maximum field of view)—this point on the angular grid is called the stitching angle.)

The initial data for solving this system of equations are the used lengths of electromagnetic waves ($\lambda_b, \lambda_r$), the refractive indices of the optical system for the used wavelengths ($n_{\lambda_b}, n_{\lambda_r}$), the aspect ratio of the sides of the field of view ($\theta/\delta$), as well as the geometric relationships of the vectors of linear elements arising from the geometric features of the waveguide architecture as seen from FIG. 5A.

$\vec{K}_{5y}=0$, $\vec{K}_{6y}=0$, $\vec{K}_{7x}=\vec{K}_{8x}$, $\vec{K}_{1x}=\vec{K}_{2x}$, $\vec{K}_{1y}=-\vec{K}_{2y}$, $\vec{K}_{3x}=\vec{K}_{4x}$, $\vec{K}_{3y}=\vec{K}_{4y}$, Moreover, the conditions for expanding the vertical field of view are the same as for expanding the horizontal field of view and dispersion compensation. These conditions follower from the geometric arrangement of the diffractive elements, and symmetry considerations.

The solution of this system of equations makes it possible to $\vec{K}_1$-$\vec{K}_8$ determine the vectors—vectors of linear diffractive elements, as well as the maximum angles of the transmitted field of view in the x and y directions ($\theta$H$\delta$)

That is, the system of equations (1) gives the grating parameters to eliminate dispersion and increase the horizontal field of view, and the system of equations (2) gives the grating parameters to increase the vertical field of view.

Thus, the disclosure has two implementations. In the first, there is a division by colors and horizontal parts of the field of view. Secondly, by colors and vertical parts of the field of view. Both of these executions are equivalent and are used depending on the setting problem.

It should be clarified that the image is generated by the projector and in this case the image is a function of the brightness for three colors in an angular coordinate grid. An image may be thought of as a set of wave vectors with corresponding angular coordinates and wavelengths. When several diffraction gratings (diffraction elements) are applied to any wave vector, In a case in which the sum of the vectors of these gratings is equal to zero, then the wave vector will remain unchanged, that is, the output image will be preserved. Therefore, the sum of the vectors of the diffractive optical elements in the set must equal zero.

The periods and orientation of the diffractive elements are calculated in such a way that some sets operate with the central part, while other sets operate with the extreme parts. All this may be calculated using the presented system of equations (2).

Due to the multiplication of radiation on the multiplying diffractive elements Y and the out-coupling diffractive element Z, the width of the eye motion box (EMB) increases, that is, the area within which the eye, moving, may see the entire virtual image completely, without losses. The field of view (the field of view of the optical system (angular field) is the cone of beams emerging from the optical system, forming the images) is increased by increasing the number of sets of diffractive elements. How exactly the field of view increases (horizontally or vertically) depends on the choice of the diffraction elements, according to the systems of equations (1) or (2).

Figure 7:
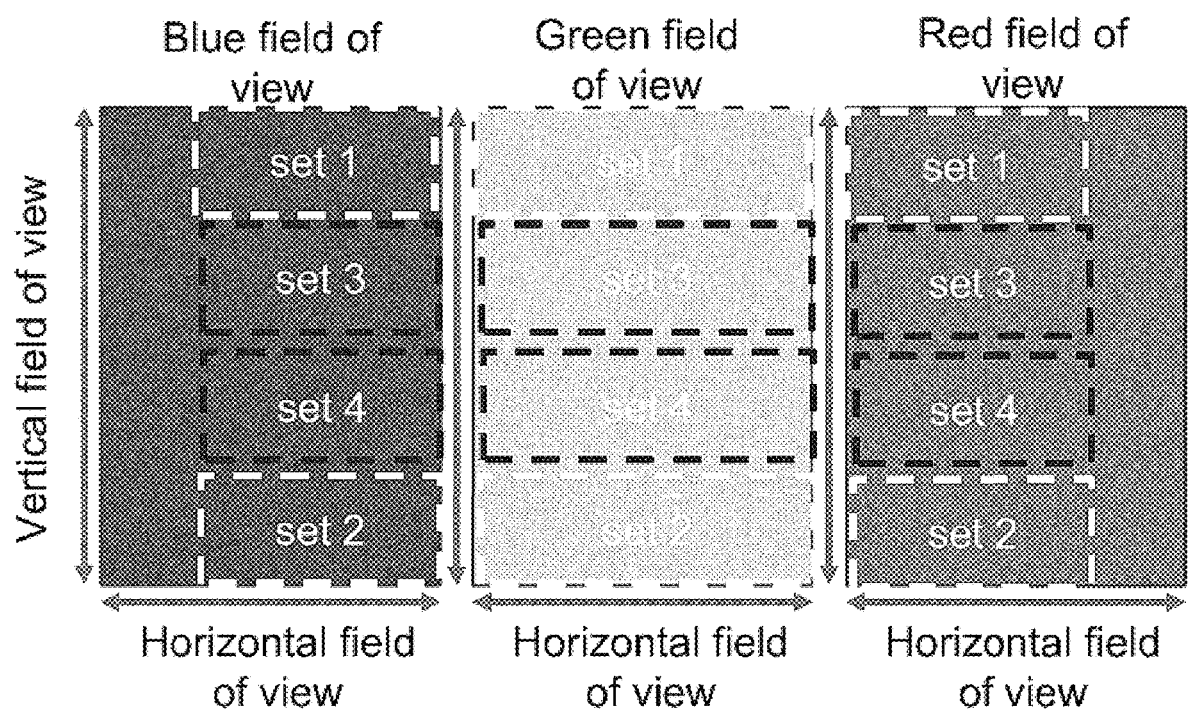
FIG. 7 illustrates a light separation of an entire field of view across sets of diffractive optical elements in a case of vertical expansion of the field of view according to an embodiment of the disclosure.

FIG. 7 illustrates the light separation of the entire field of view across sets of diffractive optical elements in the case of vertical expansion of the field of view according to an embodiment of the disclosure.

Referring to FIG. 7, with an increase in the vertical field of view (the parameters of the diffractive elements are calculated according to the system of equations (2)), the waveguide with the architecture of the diffraction gratings operates as follows:

Sets 1 and 2 of diffractive elements expand the edges of the vertical field of view, sets 3 and 4 expand the center of the field of view.

Radiation from the projector enters on the in-coupling diffractive optical element X in which it is divided at different angles into red, green and blue components.

The set 1 of diffractive elements operates as follows.

The green upper component enters on the first linear diffractive optical element of the in-coupling diffractive element X, then enters the out-coupling diffractive element Z, where radiation is multiplied by the first linear diffractive optical element of the out-coupling diffractive element Z, and is output to the user's eye using the second linear diffractive optical element of the out-coupling diffractive element Z.

The blue upper component enters on the first linear diffractive optical element of the in-coupling diffractive element X, on which diffracted is part of it that propagates in air at a horizontal angle different from the angle of incidence of the green component. It enters on the out-coupling diffractive element Z, where multiplication occurs on the first linear diffractive optical element of the out-coupling diffractive element Z, and is output into the user's eye using the second linear diffractive optical element Z.

The red upper component enters on the first linear diffractive optical element of the input diffractive element X, on which that part of it diffracts, which propagates in air at a horizontal angle different from the angles of incidence of the green component and the blue component, than it enters the out-coupling diffractive element Z, where multiplication occurs on the first linear diffractive element of the out-coupling diffractive element, and is output to the user's eye by the second linear diffractive optical element of the out-coupling diffractive element Z.

The set 2 of diffractive elements operates as follows.

The green lower component enters on the first linear diffractive optical element of the in-coupling diffractive element X, then enters on the out-coupling diffractive element Z, where radiation is multiplied by the second linear diffractive optical element of the out-coupling diffractive element Z, and is output to the user's eye using the first linear diffractive optical element of the out-coupling diffractive element Z.

The blue lower component enters on the first linear diffractive optical element of the in-coupling diffractive element X, on which that part of it diffracts, which propagates in air at a horizontal angle different from the angle of incidence of the green component, enters the out-coupling diffractive element Z, where multiplication occurs on the second linear the diffractive optical element of the out-coupling diffractive element Z, and is output to the user's eye using the first linear diffractive optical element of the out-coupling put diffractive element Z. The horizontal angle hereinafter refers to the angular component of the incident light directed towards the vector of the input diffraction $\vec{K_6}$ grating.

The red lower component enters on the first linear diffractive optical element of the in-coupling diffractive element X, on which that part of it diffracts, which propagates in air at a horizontal angle different from the angles of incidence of the green component and the blue component. It enters on the in-coupling diffractive element X, where multiplication occurs on the second linear diffractive optical element of the out-coupling diffractive element Z, and it is output to the user's eye using the first linear diffractive optical element of the out-coupling diffractive element Z.

The set 3 of the diffractive elements, consisting of a second linear diffractive optical element of the in-coupling diffractive element X of the first multiplying diffractive optical element Y and the third linear diffractive optical element of the out-coupling diffractive element Z, operates as follows.

The green central upper component enters the second linear diffractive optical element of the in-coupling diffractive element X, then enters the first multiplying diffractive element Y, where multiplication occurs, and then enters the third linear diffractive optical element of the out-coupling diffractive element Z and is output to the user's eye.

The red central upper component enters on the second linear diffractive optical element of the in-coupling diffractive element X, on which diffracted is part of it that propagates in air at a horizontal angle different from the angle of incidence of the green component. Then it enters on first multiplying diffractive element Y, where multiplication takes place, after which it enters the third linear diffractive optical element of the out-coupled diffractive element Z and is output to the user's eye.

The blue central upper component enters on the second linear diffractive optical element of the in-coupling diffractive element X, on which diffracted is part of it that propagates in air at a horizontal angle different from the angles of incidence of the green component and the red component. Then it enters on first multiplying diffractive element Y, where multiplication takes place, after which it enters the third linear diffractive optical element of the out-coupled diffractive element Z and is output to the user's eye.

The set 4 of diffractive elements operates as follows.

The green central lower component enters on the second linear diffractive optical element of the in-coupling diffractive element X, then enters on the second multiplying diffractive element Y, where multiplication occurs, and then enters the third linear diffractive optical element of the out-coupling diffractive element Z and is output to the user's eye.

The red central lower component enters on the second linear diffractive optical element of the in-coupling diffractive element X, on which diffracted is part of it that propagates in air at a horizontal angle different from the angle of incidence of the green component. Then it enters on the second multiplying diffractive element Y, where multiplication takes place, after which it enters on the third linear diffractive optical element of the out-coupling diffractive element Z and is output to the user's eye.

The blue central lower component enters on the second linear diffractive optical element of the in-coupling diffractive element X, on which diffracted is part of it that propagates in air at a horizontal angle different from the angles of incidence of the green component and red component. Then it enters on the second multiplying diffractive element Y, where multiplication takes place, after which it enters on the third linear diffractive optical element of the out-coupling diffractive element Z and is output to the user's eye.

Figure 9:
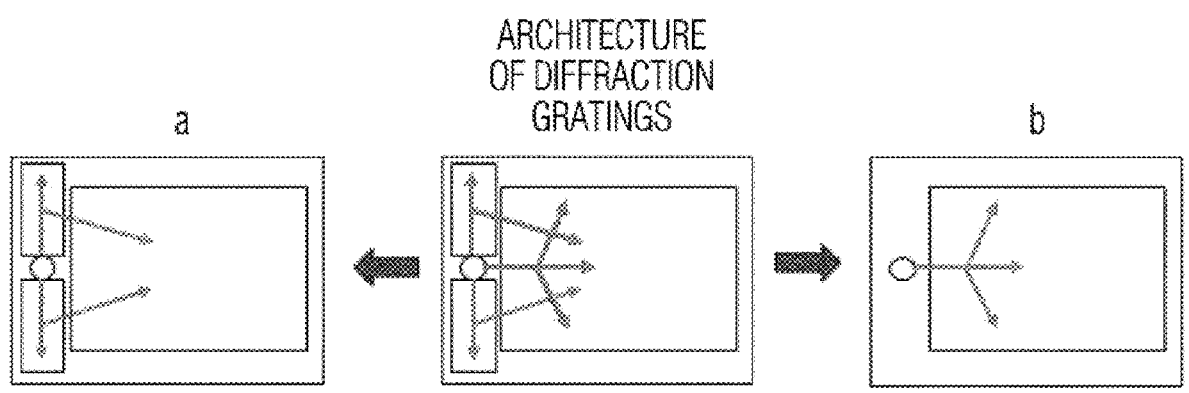
FIG. 9 illustrates two schemes of a proposed diffractive element architecture according to an embodiment of the disclosure.

FIG. 9 illustrates two schemes of the proposed architecture of diffractive elements according to an embodiment of the disclosure.

Referring to FIG. 9, depending on which system of equations (1 or 2) was used to calculate the parameters of the diffractive elements, the architecture of the diffractive elements may either compensate for the dispersion and expand the horizontal field of view (calculation using the system of equations (1)), or expand the vertical field of vision (calculation using system of equations (2)).

If the calculation is passed according to the system of equations (1), then the scheme (a), in which operated are sets of 3 and 4 of diffractive elements, operates with the red and green components of the radiation and expands the right side of the horizontal field of view, as described above, scheme (b), in which operated are sets 1 and 2 of diffractive elements, operates with blue and green radiation components and expands the left part of the horizontal field of view, as described above (FIGS. 4, 5A, and 5B).

If the calculation was carried out according to the system of equations (2), then the scheme (a), in which sets 3 and 4 of diffractive elements operate, expands the central part of the vertical field of view, as described above, scheme (b), in which sets 1 and 2 of diffractive elements expands the edge zones of the vertical field of view, as described above.

Figure 10:
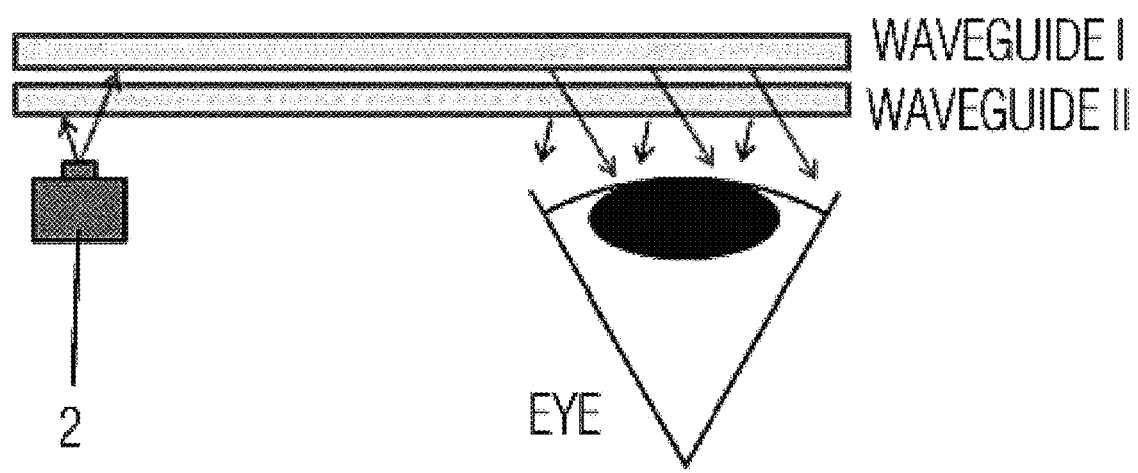
FIG. 10 illustrates use of a two-waveguide system according to an embodiment of the disclosure.
Figure 10:
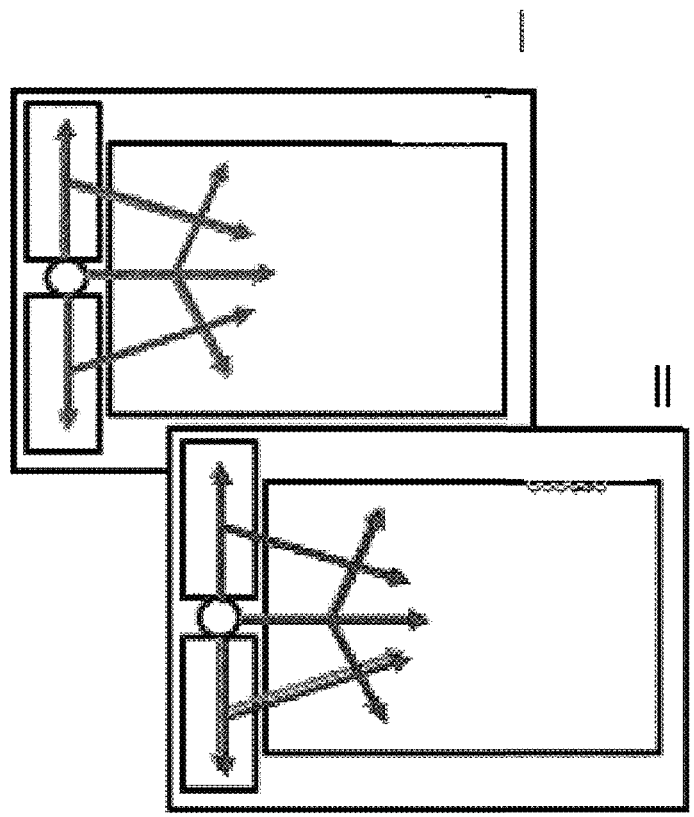

FIG. 10 illustrates use of a two-waveguide system according to an embodiment of the disclosure.

Referring to FIG. 10, it is possible to use a system of two waveguides to increase the width of the field of view. The architectures of the diffractive elements of each of the waveguides of such a system repeat each other, with one architecture of the diffractive elements on one waveguide configured to compensate for dispersion and increasing the horizontal field of view, and the second architecture of the diffractive elements on the other waveguide is configured to increase the vertical field of view.

Each of the two waveguides is designed to display its own spectral-angular portion of the field of view.

The use of two waveguides may significantly increase the field of view. Moreover, in the first waveguide the diffractive architecture is located in such a way that an increase in the vertical field of view occurs, and in the second waveguide the diffractive architecture is located in such a way that the image dispersion is compensated and the horizontal field of view increases. For example, for waveguide I, sets 1 and 2 of diffractive elements operate to expand the field of view along the edges of the image vertically, while sets 3 and 4 operate to expand the field of view in the center of the field of view vertically. For waveguide II, sets 1 and 2 operate with the left side of the image, sets 3 and 4 operate with the right side of the image, expanding the field of view horizontally and compensating for dispersion.

The operation of a system of two waveguides is described below, one of which includes the architecture of the diffractive elements calculated by the system of equations (2), and the other waveguide includes the architecture of the diffractive elements calculated by the system of equations (1).

The first waveguide includes the architecture of the diffractive elements calculated by the system of equations (2).

Radiation from the projector enters on the input diffractive optical element X of waveguide I, in which it is divided at different angles into red, green and blue components. The central left part of the red field of view, the central right part of the green field of view and the right part of the blue field of view are passed through the waveguide I. It should be clarified that different parts of the field of view with a breakdown by color are passed due to the chromatic dispersion of the input diffractive element X. The order (blue is always to the right, red is always to the left, green is somewhere in between) is valid for any diffractive element. Moreover, "to the right" and "to the left" are not absolute sides, but relative ones, taking into account the fixed input diffractive element to the left of the eye (as shown in all figures). In a case in which the input diffractive element is not to the left, but to the right of the eye, then the order changes (blue becomes to the left, red to the right, green somewhere between them). Why exactly these parts are carried out in this performance—based on the calculation, it is such a breakdown into parts of the field that is capable of providing the maximum field of view.

Set 1 of diffractive elements of waveguide I operates as follows.

The green upper component enters on the first linear diffractive optical element of the in-coupling diffractive element X, then enters the out-coupling diffractive element Z, where multiplication occurs on the first linear diffractive optical element of the out-coupling diffractive element Z, and is output into the user's eye using the second linear diffractive optical element of the diffractive element Z.

The blue upper component enters on the first linear diffractive optical element of the in-coupling diffractive element X, on which diffracted is part of it that propagates in air at a horizontal angle different from the angle of incidence of the green component. It enters on the out-coupling diffractive element Z, where multiplication occurs on the first linear diffractive optical element of the out-coupling diffractive element Z, and is output into the user's eye using the second linear diffractive optical element of the out-coupling diffractive element Z.

The red upper component enters on the first linear diffractive optical element of the in-coupling diffractive element X, on which diffracted is part of it that propagates in air at a horizontal angle different from the angles of incidence of the green component and blue component. It enters on the out-coupling diffractive element Z, where multiplication occurs on the first linear diffractive optical element of the out-coupling diffractive element Z, and is output into the user's eye using the second linear diffractive optical element of the out-coupling diffractive element Z.

Set 2 of diffractive elements of waveguide I operates as follows.

The green lower component enters on the first linear diffractive optical element of the in-coupling diffractive element X, then enters on the out-coupling diffractive element Z, where radiation is multiplied by the second linear diffractive optical element of the out-coupling diffractive element Z, and is output to the user's eye using the first linear diffractive optical element of the out-coupling diffractive element Z.

The blue lower component enters on the first linear diffractive optical element of the in-coupling diffractive element X, on which diffracted is part of it that propagates in air at a horizontal angle different from the angle of incidence of the green component. It enters the output diffractive element Z, where multiplication occurs on the second linear diffractive optical element of the diffractive element Z, and is output to the user's eye using the first linear diffractive optical element of the out-coupling diffractive element Z.

The red lower component enters on the first linear diffractive optical element of the in-coupling diffractive element X, on which that part of it diffracts, which propagates in air at a horizontal angle different from the angles of incidence of the green component and the blue component. It enters on the in-coupling diffractive element X, where multiplication occurs on the second linear diffractive optical element of the out-coupling diffractive element Z, and it is output to the user's eye using the first linear diffractive optical element of the out-coupling diffractive element Z.

Set 3 of diffractive elements of waveguide I operates as follows.

The green central upper component enters the second linear diffractive optical element of the in-coupling diffractive element X, then enters the first multiplying diffractive element Y, where multiplication occurs, and then enters the third linear diffractive optical element of the out-coupling diffractive element Z and is output to the user's eye.

The red central upper component enters on the second linear diffractive optical element of the in-coupling diffractive element X, on which diffracted is part of it that propagates in air at a horizontal angle different from the angle of incidence of the green component. Then it enters the first diffractive optical element Y, where multiplication takes place, after which it enters the third linear diffractive optical element of the output diffractive element Z and is output to the user's eye.

The blue central upper component enters on the second linear diffractive optical element of the in-coupling diffractive element X, on which diffracted is part of it that propagates in air at a horizontal angle different from the angles of incidence of the green component and the red component. Then it enters the first diffractive optical element Y, where multiplication takes place, after which it enters the third linear diffractive optical element of the output diffractive element Z and is output to the user's eye.

Set 4 of diffractive elements of waveguide I operates as follows.

The green central lower component enters on the second linear diffractive optical element of the in-coupling diffractive element X, then enters the second diffractive optical element Y, where multiplication takes place, and then enters the third linear diffractive optical element of the output diffractive element Z and is output to the user's eye.

The red central lower component enters on the second linear diffractive optical element of the in-coupling diffractive element X, on which diffracted is part of it that propagates in air at a horizontal angle different from the angle of incidence of the green component. Then it enters on the second multiplying diffractive element Y, where multiplication takes place, after which it enters on the third linear diffractive optical element of the out-coupling diffractive element Z and is output to the user's eye.

The blue central lower component enters on the second linear diffractive optical element of the in-coupling diffractive element X, on which diffracted is part of it that propagates in air at a horizontal angle different from the angles of incidence of the green component and red component. Then it enters on the second multiplying diffractive element Y, where multiplication takes place, after which it enters on the third linear diffractive optical element of the out-coupling diffractive element Z and is output to the user's eye.

Radiation from the projector enters on the input diffractive optical element X of waveguide II, in which it is divided at different angles into red, green and blue components. The extreme right part of the red field of view, the extreme left part of the green field of view and the left part of the blue field of view are passed through the waveguide II. In this embodiment, waveguide II is designed to compensate not for its own dispersion, but for the dispersion of waveguide I.

Set 1 of diffractive elements of waveguide II operates as follows.

The red component enters on the first linear diffractive optical element of the input diffractive element X, then enters the output diffractive element Z, where multiplication occurs on the first linear diffractive optical element of the output diffractive element Z, and is outputted to the user's eye using the second linear diffractive optical element of the output diffractive element Z.

Set 2 of diffractive elements of waveguide II operates as follows.

The red component enters on the first linear diffractive optical element of the in-coupling diffractive element X, then enters the output diffractive element Z, where multiplication occurs on the second linear diffractive optical element of the output diffractive element Z, and is outputted to the user's eye using the first linear diffractive optical element of the out-coupling diffractive element Z.

Set 3 of diffractive elements of waveguide II operates as follows.

The green component enters the second linear diffractive optical element of the in-coupling diffractive element X, then enters the first multiplying diffractive element Y, where multiplication occurs, after which it enters the third linear diffractive optical element of the out-coupling diffractive element Z and is output to the user's eye.

The blue component enters on the second linear diffractive optical element of the in-coupling diffractive element X, on which diffracted is that part of it, that propagates in air at an angle different from the angle of incidence of the green component. Then it enters on first multiplying diffractive element Y, where multiplication takes place, after which it enters the third linear diffractive optical element of the out-coupled diffractive element Z and is output to the user's eye.

Set 4 of diffractive elements of waveguide II operates as follows.

The green component enters the second linear diffractive optical element of the in-coupling diffractive element X, then enters the second multiplying diffractive element Y, where multiplication occurs, after which it enters the third linear diffractive optical element of the out-coupling diffractive element Z and is output to the user's eye.

The blue component enters on the second linear diffractive optical element of the in-coupling diffractive element X, on which diffracted is that part of it, that propagates in air at an angle different from the angle of incidence of the green component. Then it enters on the second multiplying diffractive element Y, where multiplication takes place, after which it enters on the third linear diffractive optical element of the out-coupling diffractive element Z and is output to the user's eye.

The diagonal field of view when using two waveguides with the proposed architecture of diffraction gratings reaches 62°.

Figure 11:
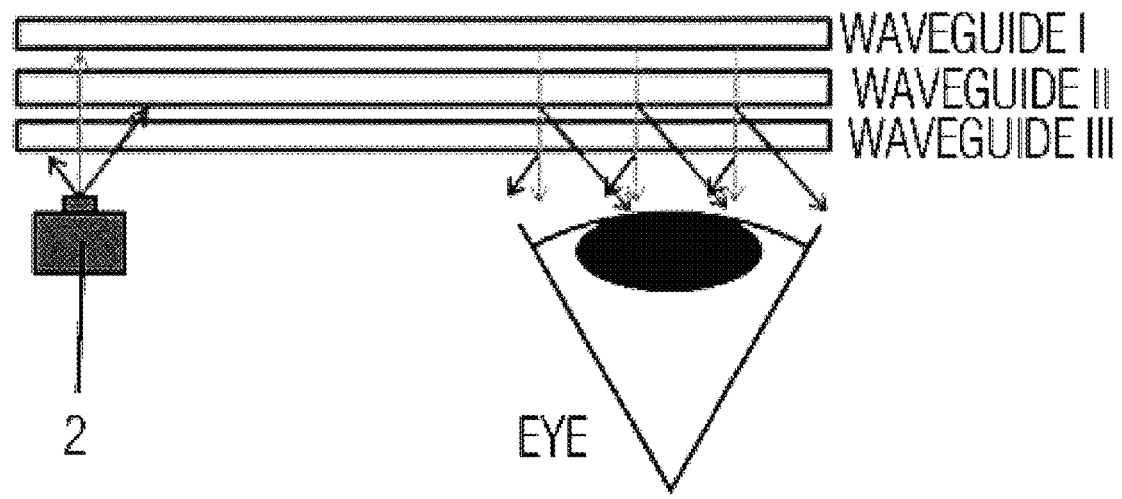
FIG. 11 illustrates a use of a three-waveguide system according to an embodiment of the disclosure.
Figure 11:
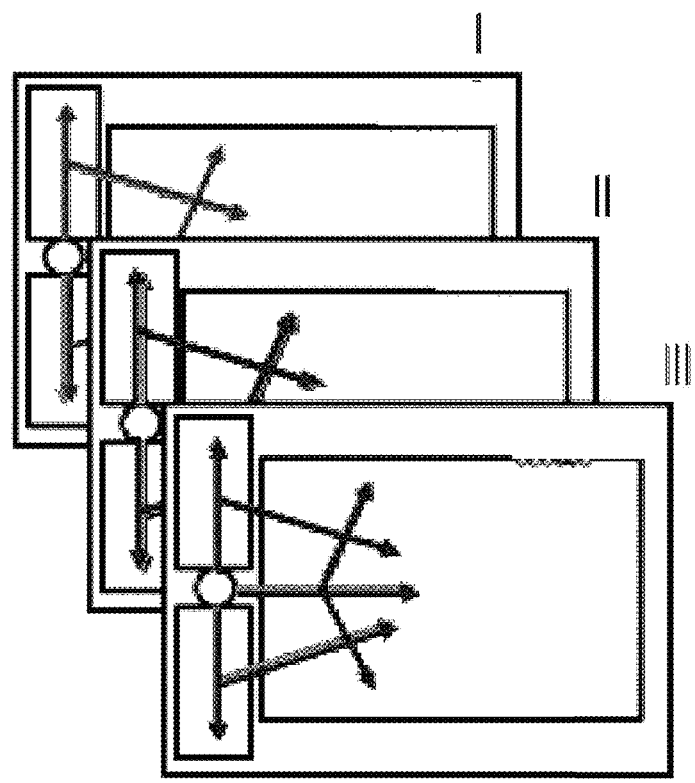

FIG. 11 illustrates the use of a three-waveguide system according to an embodiment of the disclosure.

Referring to FIG. 11, radiation from the projector enters on the in-coupling diffractive optical element X of waveguide I, in which it is divided at different angles into green and blue components. Through waveguide I, the extreme left part of the green field of view and the left central part of the blue field of view are passed. As explained above, different parts of the color-graded field of view are passed due to the chromatic dispersion of the input diffractive element.

Set 1 of diffractive elements of waveguide I operates as follows.

The green upper component enters on the first linear diffractive optical element of the in-coupling diffractive element X, then enters the out-coupling diffractive element Z, where radiation is multiplied by the first linear diffractive optical element of the out-coupling diffractive element Z, and is output to the user's eye using the second linear diffractive optical element of the out-coupling diffractive element Z.

The blue upper component enters on the first linear diffractive optical element of the in-coupling diffractive element X, on which diffracted is part of it that propagates in air at a horizontal angle different from the angle of incidence of the green component. It enters on the out-coupling diffractive element Z, where multiplication occurs on the first linear diffractive optical element of the out-coupling diffractive element Z, and is output into the user's eye using the second linear diffractive optical element of the out-coupling diffractive element Z.

Set 2 of diffractive elements of waveguide I operates as follows.

The green lower component enters on the first linear diffractive optical element of the in-coupling diffractive element X, then enters on the out-coupling diffractive element Z, where radiation is multiplied by the second linear diffractive optical element of the out-coupling diffractive element Z, and is output to the user's eye using the first linear diffractive optical element of the out-coupling diffractive element Z.

The blue lower component enters on the first linear diffractive optical element of the in-coupling diffractive element X, on which diffracted is part of it that propagates in air at a horizontal angle different from the angle of incidence of the green component. It enters on the in-coupling diffractive element X, where multiplication occurs on the second linear diffractive optical element of the out-coupling diffractive element Z, and it is output to the user's eye using the first linear diffractive optical element of the out-coupling diffractive element Z.

Set 3 of diffractive elements of waveguide I operates as follows.

The green central upper component enters the second linear diffractive optical element of the in-coupling diffractive element X, then enters the first multiplying diffractive element Y, where multiplication occurs, and then enters the third linear diffractive optical element of the out-coupling diffractive element Z and is output to the user's eye.

The blue lower component enters on the second linear diffractive optical element of the in-coupling diffractive element X, on which diffracted is part of it that propagates in air at a horizontal angle different from the angle of incidence of the green component. Then it enters on first multiplying diffractive element Y, where multiplication takes place, after which it enters the third linear diffractive optical element of the out-coupled diffractive element Z and is output to the user's eye.

Set 4 of diffractive elements of waveguide I operates as follows.

The green central lower component enters on the second linear diffractive optical element of the in-coupling diffractive element X, then enters on the second multiplying diffractive element Y, where multiplication occurs, and then enters the third linear diffractive optical element of the out-coupling diffractive element Z and is output to the user's eye.

The blue central lower component enters on the second linear diffractive optical element of the input diffractive element X, on which diffracted is part of it that propagates in air at a horizontal angle different from the angle of incidence of the green component. Then it enters on the second multiplying diffractive element Y, where multiplication takes place, after which it enters on the third linear diffractive optical element of the out-coupling diffractive element Z and is output to the user's eye.

Then the radiation from the projector, that is, the radiation that came out of the waveguide I, enters on the input diffractive optical element X of the waveguide II, in which it is divided at different angles into red, green and blue components. The extreme left part of the red field of view, the central part of the green field of view and the right central part of the blue field of view are passed through the waveguide II.

Set 1 of diffractive elements of waveguide II operates as follows.

The green upper component enters on the first linear diffractive optical element of the in-coupling diffractive element X, then enters the out-coupling diffractive element Z, where radiation is multiplied by the first linear diffractive optical element of the out-coupling diffractive element Z, and is output to the user's eye using the second linear diffractive optical element of the out-coupling diffractive element Z.

The blue upper component enters on the first linear diffractive optical element of the in-coupling diffractive element X, on which diffracted is part of it that propagates in air at a horizontal angle different from the angle of incidence of the green component. It enters the out-coupling diffractive element Z, where multiplication occurs on the first linear diffractive optical element of the output diffractive element Z, and is output into the user's eye using the second linear diffractive optical element of the output diffractive element Z.

The red upper component enters on the first linear diffractive optical element of the in-coupling diffractive element X, on which diffracted is part of it that propagates in air at a horizontal angle different from the angles of incidence of the green component and blue component. It enters on the out-coupling diffractive element Z, where multiplication occurs on the first linear diffractive optical element of the out-coupling diffractive element Z, and is output into the user's eye using the second linear diffractive optical element of the out-coupling diffractive element Z.

Set 2 of diffractive elements of waveguide II operates as follows.

The green lower component enters on the first linear diffractive optical element of the in-coupling diffractive element X, then enters on the out-coupling diffractive element Z, where radiation is multiplied by the second linear diffractive optical element of the out-coupling diffractive element Z, and is output to the user's eye using the first linear diffractive optical element of the out-coupling diffractive element Z.

The blue lower component enters on the first linear diffractive optical element of the in-coupling diffractive element X, on which diffracted is part of it that propagates in air at a horizontal angle different from the angle of incidence of the green component. It enters on the out-coupling diffractive element Z, where multiplication occurs on the second linear diffractive optical element of the out-coupling diffractive element Z, and is output to the user's eye using the first linear diffractive optical element of the out-coupling diffractive element Z.

The red lower component enters on the first linear diffractive optical element of the in-coupling diffractive element X, on which that part of it diffracts, which propagates in air at a horizontal angle different from the angles of incidence of the green component and the blue component. It enters on the out-coupling diffractive element Z, where multiplication occurs on the second linear diffractive optical element of the out-coupling diffractive element Z, and is output to the user's eye using the first linear diffractive optical element of the out-coupling diffractive element Z.

Set 3 of diffractive elements of waveguide II operates as follows.

The green central upper component enters the second linear diffractive optical element of the in-coupling diffractive element X, then enters the first multiplying diffractive element Y, where multiplication occurs, and then enters the third linear diffractive optical element of the out-coupling diffractive element Z and is output to the user's eye.

The red central upper component enters on the second linear diffractive optical element of the in-coupling diffractive element X, on which diffracted is part of it that propagates in air at a horizontal angle different from the angle of incidence of the green component. Then it enters on first multiplying diffractive element Y, where multiplication takes place, after which it enters the third linear diffractive optical element of the out-coupled diffractive element Z and is output to the user's eye.

The blue central upper component enters on the second linear diffractive optical element of the in-coupling diffractive element X, on which diffracted is part of it that propagates in air at a horizontal angle different from the angles of incidence of the green component and the red component. Then it enters on first multiplying diffractive element Y, where multiplication takes place, after which it enters the third linear diffractive optical element of the out-coupled diffractive element Z and is output to the user's eye.

Set 4 of diffractive elements of waveguide II operates as follows.

The green central lower component enters on the second linear diffractive optical element of the in-coupling diffractive element X, then enters on the second multiplying diffractive element Y, where multiplication occurs, and then enters the third linear diffractive optical element of the out-coupling diffractive element Z and is output to the user's eye.

The red central lower component enters on the second linear diffractive optical element of the in-coupling diffractive element X, on which diffracted is part of it that propagates in air at a horizontal angle different from the angle of incidence of the green component. Then it enters on the second multiplying diffractive element Y, where multiplication takes place, after which it enters on the third linear diffractive optical element of the out-coupling diffractive element Z and is output to the user's eye.

The blue central lower component enters on the second linear diffractive optical element of the in-coupling diffractive element X, on which diffracted is part of it that propagates in air at a horizontal angle different from the angles of incidence of the green component and red component. Then it enters on the second multiplying diffractive element Y, where multiplication takes place, after which it enters on the third linear diffractive optical element of the out-coupling diffractive element Z and is output to the user's eye.

Then the radiation from the projector enters on the input diffractive optical element X of the waveguide III, in which it is divided at different angles into red, green and blue components. The central right part of the red field of view, the right part of the green field of view and the extreme right central part of the blue field of view are passed through the waveguide III.

Set 1 of diffractive elements of waveguide III operates as follows.

The green upper component enters on the first linear diffractive optical element of the in-coupling diffractive element X, then enters the out-coupling diffractive element Z, where radiation is multiplied by the first linear diffractive optical element of the out-coupling diffractive element Z, and is output to the user's eye using the second linear diffractive optical element of the out-coupling diffractive element Z.

The blue upper component enters on the first linear diffractive optical element of the in-coupling diffractive element X, on which diffracted is part of it that propagates in air at a horizontal angle different from the angle of incidence of the green component. It enters on the out-coupling diffractive element Z, where multiplication occurs on the first linear diffractive optical element of the out-coupling diffractive element Z, and is output into the user's eye using the second linear diffractive optical element of the out-coupling diffractive element Z.

The red upper component enters on the first linear diffractive optical element of the in-coupling diffractive element X, on which diffracted is part of it that propagates in air at a horizontal angle different from the angles of incidence of the green component and blue component. It enters on the out-coupling diffractive element Z, where multiplication occurs on the first linear diffractive optical element of the out-coupling diffractive element Z, and is output into the user's eye using the second linear diffractive optical element of the out-coupling diffractive element Z.

Set 2 of diffractive elements of waveguide III operates as follows.

The green lower component enters on the first linear diffractive optical element of the in-coupling diffractive element X, then enters the out-coupling diffractive element Z, where radiation is multiplied by the second linear diffractive optical element of the out-coupling diffractive element Z, and is output to the user's eye using the first linear diffractive optical element of the diffractive element Z.

The blue lower component enters on the first linear diffractive optical element of the in-coupling diffractive element X, on which diffracted is part of it that propagates in air at a horizontal angle different from the angle of incidence of the green component. It enters on the in-coupling diffractive element X, where multiplication occurs on the second linear diffractive optical element of the out-coupling diffractive element Z, and it is output to the user's eye using the first linear diffractive optical element of the out-coupling diffractive element Z.

The red lower component enters on the first linear diffractive optical element of the in-coupling diffractive element X, on which that part of it diffracts, which propagates in air at a horizontal angle different from the angles of incidence of the green component and the blue component. It enters on the in-coupling diffractive element X, where multiplication occurs on the second linear diffractive optical element of the out-coupling diffractive element Z, and it is output to the user's eye using the first linear diffractive optical element of the out-coupling diffractive element Z.

Set 3 of diffractive elements of waveguide III operates as follows.

The green central upper component enters the second linear diffractive optical element of the input diffractive element X, then enters the first multiplying diffractive element of the diffractive optical element Y, where multiplication occurs, and then enters the third linear diffractive optical element of the output diffractive element Z and is output to the user's eye.

The red central upper component enters on the second linear diffractive optical element of the in-coupling diffractive element X, on which diffracted is part of it that propagates in air at a horizontal angle different from the angle of incidence of the green component. Then it enters on first multiplying diffractive element Y, where multiplication takes place, after which it enters the third linear diffractive optical element of the out-coupled diffractive element Z and is output to the user's eye.

The blue central upper component enters on the second linear diffractive optical element of the in-coupling diffractive element X, on which diffracted is part of it that propagates in air at a horizontal angle different from the angles of incidence of the green component and the red component. Then it enters on first multiplying diffractive element Y, where multiplication takes place, after which it enters the third linear diffractive optical element of the out-coupled diffractive element Z and is output to the user's eye.

Set 4 of diffractive elements of waveguide III operates as follows.

The green central lower component enters on the second linear diffractive optical element of the in-coupling diffractive element X, then enters on the second multiplying diffractive element Y, where multiplication occurs, and then enters the third linear diffractive optical element of the out-coupling diffractive element Z and is output to the user's eye.

The red central lower component enters on the second linear diffractive optical element of the in-coupling diffractive element X, on which diffracted is part of it that propagates in air at a horizontal angle different from the angle of incidence of the green component. Then it enters on the second multiplying diffractive element Y, where multiplication takes place, after which it enters on the third linear diffractive optical element of the out-coupling diffractive element Z and is output to the user's eye.

The blue central lower component enters on the second linear diffractive optical element of the in-coupling diffractive element X, on which diffracted is part of it that propagates in air at a horizontal angle different from the angles of incidence of the green component and red component. Then it enters on the second multiplying diffractive element Y, where multiplication takes place, after which it enters on the third linear diffractive optical element of the out-coupling diffractive element Z and is output to the user's eye.

The diagonal field of view when using three waveguides with the proposed architecture of diffraction gratings reaches 76°.

Figure 12:
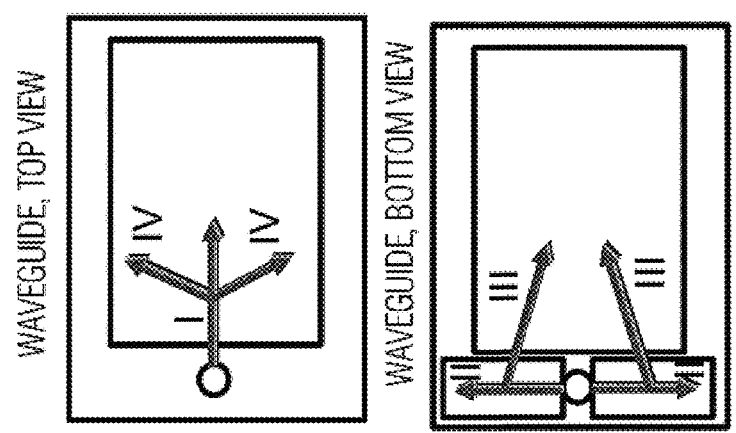
FIG. 12 illustrates a use of a waveguide with grating architectures applied to both sides according to an embodiment of the disclosure.
Figure 12:
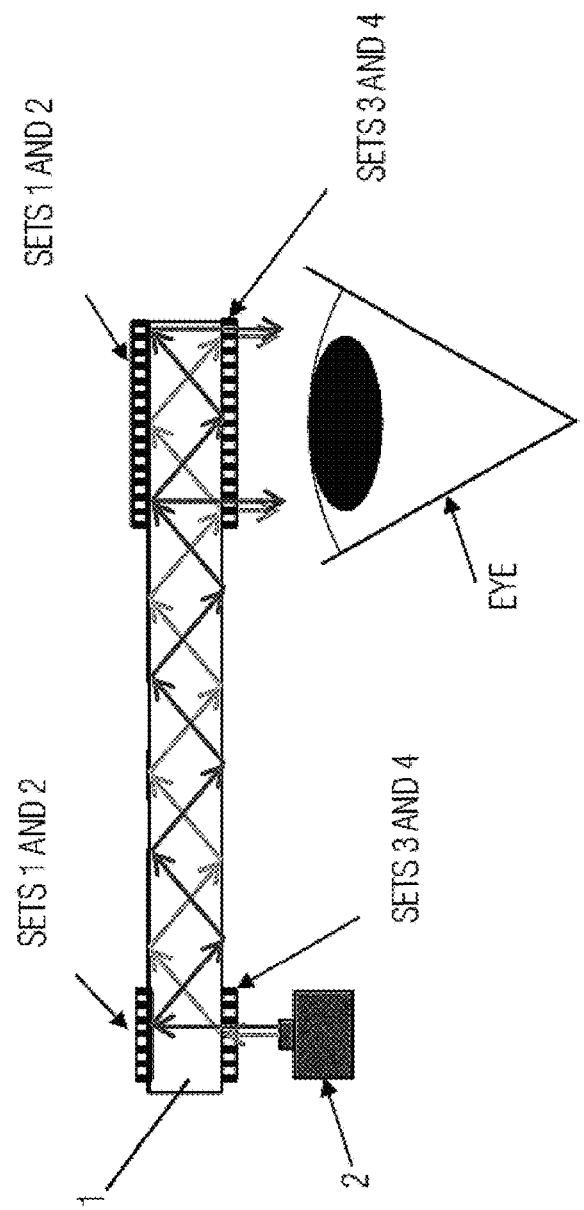

FIG. 12 shows that waveguide architectures may be applied to opposite sides of a single waveguide according to an embodiment of the disclosure.

Referring to FIG. 12, sets 1 and 2 of diffractive elements may be located on one side of the waveguide, and sets 3 and 4 of diffractive optical elements may be located on the other side of the waveguide. Such a structure is easy to manufacture and may be used both to increase the vertical field of view and to increase the horizontal field of view.

With an increase in the horizontal field of view, the waveguide operates as follows:

Radiation from the projector enters on the in-coupling diffractive optical element X in which it is divided at different angles into red, green and blue components.

The set 1 of the diffractive elements located on the first side of the waveguide operates as follows.

The green component enters on the first linear diffractive optical element of the in-coupling diffractive element X, then enters the out-coupling diffractive element Z, where radiation is multiplied by the first linear diffractive optical element of the out-coupling diffractive element Z, and is output to the user's eye using the second linear diffractive optical element of the out-coupling diffractive element Z.

The blue component enters on the first linear diffractive optical element of the in-coupling diffractive element X, on which diffracted is part of it that propagates in air at an angle different from the angle of incidence of the green component. It enters on the out-coupling diffractive element Z, where multiplication occurs on the first linear diffractive optical element of the out-coupling diffractive element Z, and is output into the user's eye using the second linear diffractive optical element of the out-coupling diffractive element Z.

The set 2 of the diffractive elements located on the first side of the waveguide operates as follows.

The green component enters on the first linear diffractive optical element of the in-coupling diffractive element X, then enters the out-coupling diffractive element Z, where radiation is multiplied by the second linear diffractive optical element of the out-coupling diffractive element Z, and is output to the user's eye using the first linear diffractive optical element of the out-coupling diffractive element Z.

The blue component enters on the first linear diffractive optical element of the in-coupling diffractive element X, on which diffracted is part of it that propagates in air at an angle different from the angle of incidence of the green component. It enters on the out-coupling diffractive element Z, where multiplication occurs on the second linear diffractive optical element of the out-coupling diffractive element Z, and is output to the user's eye using the first linear diffractive optical element of the out-coupling diffractive element Z.

The set 3 of the diffractive elements located on the second side of the waveguide operates as follows.

The green component enters the second linear diffractive optical element of the in-coupling diffractive element X, then enters the first multiplying diffractive element Y, where multiplication occurs, after which it enters the third linear diffractive optical element of the out-coupling diffractive element Z and is output to the user's eye.

The red component enters on the second linear diffractive optical element of the input diffractive element X, on which diffracted is that part of it, that propagates in air at an angle different from the angle of incidence of the green component. Then it enters on first multiplying diffractive element Y, where multiplication takes place, after which it enters the third linear diffractive optical element of the out-coupled diffractive element Z and is output to the user's eye.

The set 4 of the diffractive elements located on the second side of the waveguide operates as follows.

The green component enters on the second linear diffractive optical element of the in-coupling diffractive element X, then enters on the second multiplying diffractive element Y, where multiplication occurs, after which it enters the third linear diffractive optical element of the out-coupling diffractive element Z and is output to the user's eye.

The red component enters on the second linear diffractive optical element of the input diffractive element X, on which diffracted is that part of it, that propagates in air at an angle different from the angle of incidence of the green component. Then it enters on the second multiplying diffractive element Y, where multiplication takes place, after which it enters on the third linear diffractive optical element of the out-coupling diffractive element Z and is output to the user's eye.

With an increase in the vertical field of view, the waveguide operates as follows:

Radiation from the projector enters on the in-coupling diffractive optical element X in which it is divided at different angles into red, green and blue components.

The set 1 of the diffractive elements located on the first side of the waveguide operates as follows.

The green upper component enters on the first linear diffractive optical element of the in-coupling diffractive element X, then enters the out-coupling diffractive element Z, where radiation is multiplied by the first linear diffractive optical element of the out-coupling diffractive element Z, and is output to the user's eye using the second linear diffractive optical element of the out-coupling diffractive element Z.

The blue upper component enters on the first linear diffractive optical element of the in-coupling diffractive element X, on which diffracted is part of it that propagates in air at a horizontal angle different from the angle of incidence of the green component. It enters on the out-coupling diffractive element Z, where multiplication occurs on the first linear diffractive optical element of the out-coupling diffractive element Z, and is output into the user's eye using the second linear diffractive optical element of the out-coupling diffractive element Z.

The red upper component enters on the first linear diffractive optical element of the in-coupling diffractive element X, on which diffracted is part of it that propagates in air at a horizontal angle different from the angles of incidence of the green component and blue component. It enters on the out-coupling diffractive element Z, where multiplication occurs on the first linear diffractive optical element of the out-coupling diffractive element Z, and is output into the user's eye using the second linear diffractive optical element of the out-coupling diffractive element Z.

The set 2 of the diffractive elements located on the first side of the waveguide operates as follows.

The green lower component enters on the first linear diffractive optical element of the in-coupling diffractive element X, then enters the out-coupling diffractive element Z, where radiation is multiplied by the second linear diffractive optical element of the out-coupling diffractive element Z, and is output to the user's eye using the first linear diffractive optical element of the diffractive element Z.

The blue lower component enters on the first linear diffractive optical element of the in-coupling diffractive element X, on which diffracted is part of it that propagates in air at a horizontal angle different from the angle of incidence of the green component. It enters on the in-coupling diffractive element X, where multiplication occurs on the second linear diffractive optical element of the in-coupling diffractive element X, and is output into the user's eye using the first linear diffractive optical element of the out-coupling diffractive element Z.

The red lower component enters on the first linear diffractive optical element of the in-coupling diffractive element X, on which that part of it diffracts, which propagates in air at a horizontal angle different from the angles of incidence of the green component and the blue component. It enters on the in-coupling diffractive element X, where multiplication occurs on the second linear diffractive optical element of the out-coupling diffractive element Z, and it is output to the user's eye using the first linear diffractive optical element of the out-coupling diffractive element Z.

The set 3 of the diffractive elements located on the second side of the waveguide operates as follows.

The green central upper component enters the second linear diffractive optical element of the in-coupling diffractive element X, then enters the first multiplying diffractive element Y, where multiplication occurs, and then enters the third linear diffractive optical element of the out-coupling diffractive element Z and is output to the user's eye.

The red central upper component enters on the second linear diffractive optical element of the in-coupling diffractive element X, on which diffracted is part of it that propagates in air at a horizontal angle different from the angle of incidence of the green component. Then it enters on first multiplying diffractive element Y, where multiplication takes place, after which it enters the third linear diffractive optical element of the out-coupled diffractive element Z and is output to the user's eye.

The blue central upper component enters on the second linear diffractive optical element of the in-coupling diffractive element X, on which diffracted is part of it that propagates in air at a horizontal angle different from the angles of incidence of the green component and the red component. Then it enters on first multiplying diffractive element Y, where multiplication takes place, after which it enters the third linear diffractive optical element of the out-coupled diffractive element Z and is output to the user's eye.

The set 4 of the diffractive elements located on the second side of the waveguide operates as follows.

The green central lower component enters on the second linear diffractive optical element of the in-coupling diffractive element X, then enters on the second multiplying diffractive element Y, where multiplication occurs, and then enters the third linear diffractive optical element of the out-coupling diffractive element Z and is output to the user's eye.

The red central lower component enters on the second linear diffractive optical element of the in-coupling diffractive element X, on which diffracted is part of it that propagates in air at a horizontal angle different from the angle of incidence of the green component. Then it enters on the second multiplying diffractive element Y, where multiplication takes place, after which it enters on the third linear diffractive optical element of the out-coupling diffractive element Z and is output to the user's eye.

The blue central lower component enters on the second linear diffractive optical element of the in-coupling diffractive element X, on which diffracted is part of it that propagates in air at a horizontal angle different from the angles of incidence of the green component and red component. Then it enters on the second multiplying diffractive element Y, where multiplication takes place, after which it enters on the third linear diffractive optical element of the out-coupling diffractive element Z and is output to the user's eye.

In the proposed architecture, diffractive optical elements may be configured as follows.

A) All diffractive optical elements may be made in the form of homogeneous structures, which means that the modulation amplitude of the optical parameters of diffractive optical elements does not change depending on the X-Y coordinates along the plane of the waveguide.

B) All diffractive optical elements may be made in the form of segmented structures with different shapes, different sizes and spaced from each other at different distances. In this case, the modulation amplitude of the optical parameters of the diffractive optical elements is a piecewise function depending on the X-Y coordinates (along the plane of the waveguide). That is, at some points on the waveguide, the modulation amplitude is present, at others it is not. In other words, the element is made in the form, for example, of circles of a certain radius, spaced at a certain distance from each other. This design is valid for diffractive optical elements Y and Z (not for X). The specific design may be very diverse depending on the specific task, the thickness of the waveguide, the material, and so on, so the most general formulation is given here.

C) All diffractive optical elements may be made in the form of a volumetric structure, for example, in the form of a diffractive holographic element. Volumetric structure is a property of the implementation of a diffractive element, which means that the change in optical parameters occurs in the volume of the material, and not on its surface. This implementation is common for each of the X, Y and Z diffractive optical element.

D) All diffractive optical elements may be made in the form of a relief or planar structure. Relief planar structure is a property of the performance of any diffractive element, which means that the change in optical parameters occurs on the surface of the material, and not in its volume. This implementation is common for each of the X, Y and Z diffractive optical elements.

E) All diffractive optical elements may be made in the form of both a volumetric structure and a relief structure, this property means that the change in optical parameters occurs both in the volume and on the surface. This implementation is common for each of the X, Y and Z diffractive optical elements.

E) Each diffractive optical element may be made as a part of the waveguide either inside the waveguide itself, for example, as a holographic optical element recorded inside the waveguide, or on its surface in a case in which a relief or mixed structure is created on the waveguide surface. This implementation is common for each of the X, Y and Z diffractive optical elements.

G) The diffractive optical element may be made on a separate layer of the waveguide, either inside the layer, or on the surface of the layer. This implementation is common for each of the X, Y and Z diffractive optical elements.

Each set renders its part of the field of view on an angular coordinate grid, while this part of the field of view differs depending on the color. Each set is capable of rendering all three colors in different parts of the angular coordinate grid, but not all three colors may be used for any set of diffractive elements, it depends on both the set and the design. The situation described above (sets 1 and 2 with blue and part of green, 3 and 4 with red and part of green) is valid for the execution of one waveguide, but not for the execution of two or three waveguides. In the case of multiple waveguides, separation is valid, in which predefined sets of diffractive elements operate in each waveguide. Some parts of the visual field will inevitably be transmitted not in one set, but in two or even four. This is due to the fact that at the output, all parts of the field of view should form a single image without gaps. The shape of the parts of the field of view is not square, it has a curved border. Therefore, for the absence of gaps, it is necessary to calculate the diffractive elements in such a way that at some points of the grid of angular coordinates, they will overlap each other. At these locations, the same points on the grid of angular coordinates may be transmitted by more than one set of diffractive elements.

Thanks to the disclosure, only one waveguide may be used in an augmented reality device, thereby reducing the thickness of the device, its size and weight, also increasing the transparency of the augmented reality device, in addition, the augmented reality device has a high resolution and full color image. Also, the proposed disclosure provides a wide field of view, which provides the user with the effect of presence. The radiation is entered from the side, observing the horizontal form factor—when the radiation is introduced from the side, the dimensions of the transmitted field of view horizontally will not be narrower than the dimensions of the transmitted field of view vertically The disclosure is conveniently applied in augmented reality glasses, where light weight and compact dimensions are important. The proposed disclosure may be conveniently applied to augmented reality devices used for any purpose.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An architecture of diffraction optical elements in a waveguide for an augmented reality device, comprising:
    an in-coupling diffractive element configured to input radiation from a projector, and including a first linear diffractive optical element of the in-coupling diffractive element and a second linear diffractive optical element of the in-coupling diffractive element;
    a first multiplying diffractive element and a second multiplying diffractive element configured to multiply radiation; and
    an out-coupling diffractive element configured to multiply radiation and output radiation from the waveguide, and includes a first linear diffractive optical element of an output diffractive element, a second linear diffractive optical element of the output diffractive element, a third linear diffractive optical element of the output diffractive element,
    wherein the in-coupling diffractive element is configured during an operation of the augmented reality device, to separate an image from the projector into color components of the image red, green, and blue, and a direction of a path of beams of each of the color components through the corresponding set of diffractive elements, wherein along a course of radiation:
        a first set of diffractive elements consists from the first linear diffractive optical element of the in-coupling diffractive element, the first and second linear diffractive optical elements of the out-coupling diffractive element,
        a second set of diffractive elements consists from the first linear diffractive optical element of the in-coupling diffractive element, the second and first linear diffractive optical elements of the out-coupling diffractive element,
    wherein a third set of diffractive elements consists of a second linear diffractive optical element of the in-coupling diffractive element of the first multiplying diffractive optical element and the third linear diffractive optical element of the output diffractive element, and
    wherein a fourth set of diffractive elements consists of a second linear diffractive optical element of an in-coupling diffractive element, a second multiplying diffractive element and a third linear diffractive optical element of an output diffractive element.

2. The architecture according to claim 1, wherein a sum of vectors of all diffractive elements in each set is equal to zero.

3. The architecture according to claim 1,
    wherein the first set of diffractive elements and the third set of diffractive elements are configured to conduct an upper part of a field of view, and
    wherein the second set of diffractive elements and the fourth set of diffractive elements are configured to conduct a lower part of the field of view.

4. The architecture according to claim 1, wherein the direction of the path of the beams of each of the color components depends on parameters of the diffractive elements, calculated from a system of equations:

$$\begin{cases} \left| \overrightarrow{k_{\lambda_b,\theta,\delta}} - \overrightarrow{K_5} \right| = \frac{2\pi n_{\lambda_b}}{\lambda_b} \\ \left| \overrightarrow{k_{\lambda_g,\ldots\theta,0}} + \overrightarrow{K_6} \right| = \frac{2\pi}{\lambda_g} \\ \left| \overrightarrow{k_{\lambda_g,\theta,0}} + \overrightarrow{K_5} + \overrightarrow{K_6} \right| = \frac{2\pi}{\lambda_g} \\ \left| \overrightarrow{k_{\lambda_r,\theta,0}} - \overrightarrow{K_7} \right| = \frac{2\pi n_{\lambda_r}}{\lambda_r} \\ \left| \overrightarrow{k_{\lambda_b,\theta,0}} + \overrightarrow{K_1} \right| = \frac{2\pi n_{\lambda_b}}{\lambda_b} \\ \left( \overrightarrow{k_{\lambda_b,\theta,0}} + \overrightarrow{K_1} \right)_x = 0 \\ 0 = \min \left( \left| \overrightarrow{k_{\lambda_g,\ldots\theta,\delta}} - \overrightarrow{K_7} \right| - \frac{2\pi}{\lambda_g}, \right. \\ \left. \left| \overrightarrow{k_{\lambda_b,\ldots\theta,\ldots\delta}} + \overrightarrow{K_1} \right| - \frac{2\pi}{\lambda_b} \right) \end{cases}$$

where $\overrightarrow{k_{l,x,y}}$ is a wave vector of an electromagnetic wave, defined by three coordinates l, x, y, where l is a length of the electromagnetic wave, x is an angular coordinate of the electromagnetic wave in the x direction, y is the angular coordinate of the electromagnetic wave in the y direction, $n_{\lambda_b}$ is a refractive index of an optical system for a wavelength $\lambda_b$, $n_{\lambda_g}$ is the refractive index of the optical system for the wavelength $\lambda_g$, $n_{\lambda_r}$ is the refractive index of the optical system for the wavelength $\lambda_r$, $\lambda_b$ is the length of the electromagnetic wave corresponding to blue, $\lambda_g$ is the length of the electromagnetic wave corresponding to green, $\lambda_r$ is the length of the electromagnetic wave corresponding to red, $\theta$ is the maximum angle of a transmitted field of view in the x direction when a size of a field of view in the x direction is $2\theta$, and $\delta$ is the maximum angle of a transmitted field of view in the y direction when the size of the field of view in the y direction is $2\delta$, and wherein an initial data for solving this system of equations are used electromagnetic wavelengths ($\lambda_b$, $\lambda_g$, $\lambda_r$), refractive indices of the optical system for used wavelengths ($n_{\lambda_b}$, $n_{\lambda_r}$, $n_{\lambda_g}$) an aspect ratio of sides of the field of view ($\theta/\delta$), as well as the following geometric relationships of vectors of linear elements:

$\vec{K}_{5y}=0$, $\vec{K}_{6y}=0$, $\vec{K}_{7x}=\vec{K}_{8x}$, $\vec{K}_{1x}=\vec{K}_{2x}$, $\vec{K}_{1y}=-\vec{K}_{2y}$, $\vec{K}_{3x}=\vec{K}_{4x}$, $\vec{K}_{3y}=\vec{K}_{4y}$, where vectors, $\vec{K}_1$, $\vec{K}_2$ correspond to "+1" and "−1" diffraction orders of the second linear diffractive optical element of the in-coupling diffractive element, vector $\vec{K}_3$ corresponds to the second multiplying diffractive optical element, vector $\vec{K}_4$ corresponds to the first multiplying diffractive optical element, vector $\vec{K}_5$ corresponds to third linear diffractive optical element of the out-coupling diffractive element, vector $\vec{K}_6$ corresponds to first linear diffractive optical element of the in-coupling diffractive element, vector $\vec{K}_7$ corresponds to second linear diffractive optical element of the out-coupling diffractive element, and vector $\vec{K}_8$ corresponds to first linear diffractive optical element of the out-coupling diffractive element.

5. The architecture according to claim 1,
wherein the direction of the path of the beams of each of the color components depends on parameters of the diffractive elements, calculated from a system of equations:

$$\begin{cases} \left|\overrightarrow{k_{\lambda_b,\ldots\theta,0}} - \vec{K}_5\right| = \frac{2\pi}{\lambda_b} \\ \left|\overrightarrow{k_{\lambda_r,\theta,\delta}} - \vec{K}_5\right| = \frac{2\pi n_{\lambda_r}}{\lambda_r} \\ \left|\overrightarrow{k_{\lambda_r,\ldots\theta,\delta}} - \vec{K}_5 + \vec{K}_8\right| = \frac{2\pi}{\lambda_r} \\ \left|\overrightarrow{k_{\lambda_r,\ldots\theta,\varphi}} - \vec{K}_5 + \vec{K}_8\right| = \frac{2\pi n \lambda_r}{\lambda_r} \\ \left|\overrightarrow{k_{\lambda_r,\theta,\psi}} - \vec{K}_5 + \vec{K}_8\right| = \frac{2\pi n \lambda_r}{\lambda_r} \\ \frac{2\pi}{\lambda_r} = \min\left(\left|\overrightarrow{k_{\lambda_r,\theta,\psi}} + \vec{K}_2\right|, \left|\overrightarrow{k_{\lambda_r,\ldots\theta,\varphi}} + \vec{K}_2\right|\right) \\ \left(\left|\overrightarrow{k_{\lambda_r,\ldots\theta,0}} + \vec{K}_2\right|\right)_x = 0 \\ \left|\overrightarrow{k_{\lambda_b,\theta,0}} + \vec{K}_2\right| = \frac{2\pi n_{\lambda_b}}{\lambda_0} \end{cases}$$

where $\vec{k}_{l,x,y}$ is a wave vector of an electromagnetic wave, defined by three coordinates l, x, y, where l is a length of the electromagnetic wave, x is an angular coordinate of the electromagnetic wave in the x direction, y is the angular coordinate of the electromagnetic wave in the y direction, $n_{\lambda_b}$ is a refractive index of an optical system for a wavelength $\lambda_b$, $n_{\lambda_r}$ is the refractive index of the optical system for the wavelength $\lambda_r$, $\lambda_b$ is the length of the electromagnetic wave corresponding to blue, $\lambda_r$ is the length of the electromagnetic wave corresponding to red, and $\varphi$ and $\psi$ are angles within a field of view in the y direction, which are the angles of contact of two parts of the field of view, transmitted sets 1, 2 and sets 3, 4, wherein an initial data for solving this system of equations are used electromagnetic wavelengths ($\lambda_b$, $\lambda_r$), refractive indices of the optical system for used wavelengths ($n_{\lambda_b}$, $n_{\lambda_r}$), an aspect ratio of sides of the field of view ($\theta/\delta$), as well as the following geometric relationships of vectors of linear elements resulting from geometric features of a waveguide architecture:

$\vec{K}_{5y}=0$, $\vec{K}_{6y}=0$, $\vec{K}_{7x}=\vec{K}_{8x}$, $\vec{K}_{1x}=\vec{K}_{2x}$, $\vec{K}_{1y}=-\vec{K}_{2y}$, $\vec{K}_{3x}=\vec{K}_{4x}$, $\vec{K}_{3y}=\vec{K}_{4y}$, where vectors $\vec{K}_1$, $\vec{K}_2$ correspond to "+1" and "−1" diffraction orders of the second linear diffractive optical element of the in-coupling diffractive element, vector $\vec{K}_3$ corresponds to the second multiplying diffractive optical element, vector $\vec{K}_4$ corresponds to the first multiplying diffractive optical element, vector $\vec{K}_5$ corresponds to third linear diffractive optical element of the out-coupling diffractive element, vector $\vec{K}_6$ corresponds to first linear diffractive optical element of the in-coupling diffractive element, vector $\vec{K}_7$ corresponds to second linear diffractive optical element of the out-coupling diffractive element, and vector $\vec{K}_8$ corresponds to first linear diffractive optical element of the out-coupling diffractive element.

6. The architecture according to claim 4, wherein all the diffractive elements are applied to one side of the waveguide.

7. The architecture according to claim 4,
wherein the first set and the second set of diffractive elements are located on one side of the waveguide, and
wherein the third set and the fourth set of diffractive elements are located on the opposite side of the waveguide.

8. The architecture according to claim 4,
wherein the radiation from the projector enters the input diffractive element, in which it is divided into the red component of the image, a blue component of the image and a green component of the image and is directed to the sets of diffractive elements operating simultaneously,
wherein the first set of diffractive elements operates as follows:
the green component of the image enters on the first linear diffractive optical element of the in-coupling diffractive element, then enters the output diffractive element, where radiation is multiplied by the first linear diffractive optical element of the out-coupling diffractive element, and is output to a user's eye using the second linear diffractive optical element of the output diffractive element, and
the blue component enters on the first linear diffractive optical element of the in-coupling diffractive element, on which that part of it diffracts, which propagates at an angle different from the angle of incidence of the green component, enters the out-coupling diffractive element, where multiplication occurs on the first linear diffractive optical element of the output diffractive element, and is output to the user's eye using the second linear diffractive optical element of the out-coupling diffractive element,
wherein the second set of diffractive elements operates as follows:
the green component of the image enters on the first linear diffractive optical element of the in-coupling diffractive element, then enters the out-coupling diffractive element, where radiation is multiplied by the second linear diffractive optical element of the out-coupling diffractive element, and is output to the user's eye using the first linear diffractive optical element of the out-coupling diffractive element, and
the blue component enters on the first linear diffractive optical element of the in-coupling diffractive element, on which that part of it diffracts, which propagates at an angle different from the angle of incidence of the green component, enters the out-coupling diffractive element, where multiplication occurs by the second linear diffractive optical element of the out-coupling diffractive element, and is output to the user's eye using the first linear diffractive optical element of the out-coupling diffractive element,
wherein the third set of diffractive elements operates as follows:
the green component enters the second linear diffractive optical element of the in-coupling diffractive element, then enters the first multiplying diffractive element, where multiplication occurs, after which it enters the third linear diffractive optical element of the out-coupling diffractive element and is output to the user's eye, and
the red component enters the second linear diffractive optical element of the in-coupling diffractive element, on which that part of it diffracts, which propagates at an angle different from the angle of incidence of the green component, then enters the first multiplying diffractive element, where multiplication takes place, and then enters into the third linear the diffractive optical element of the output diffractive element and is output to the user's eye, and
wherein the fourth set of diffractive elements operates as follows:
the green component enters the second linear diffractive optical element of the in-coupling diffractive element, then enters the second multiplying diffractive element, where multiplication occurs, after which it enters the third linear diffractive optical element of the out-coupling diffractive element and is output to the user's eye, and
the red component enters on the second linear diffractive optical element of the in-coupling diffractive element, on which diffracted is part propagates at an angle different from the angle of incidence of the green component, then enters the second multiplying diffractive element, where multiplication occurs, and then enters into the third linear the diffractive optical element of the out-coupling diffractive element and is output to the user's eye.

9. The architecture according to claim 8, wherein the green component enters on the second linear diffractive optical element of an in-coupling diffractive element X, then enters on a second multiplying diffractive element Y, where multiplication occurs, after which the green component enters a third linear diffractive optical element of an out-coupling diffractive element Z and is output to the user's eye.

10. The architecture of claim 9, wherein the red component enters on the second linear diffractive optical element of an input diffractive element X, on which diffracted is that part of the red component, that propagates in air at an angle different from the angle of incidence of the green component.

11. The architecture of claim 10, wherein the red component enters on the second multiplying diffractive element Y, where multiplication takes place, after which the red component enters on the third linear diffractive optical element of the out-coupling diffractive element Z and is output to the user's eye.

12. The architecture according to claim 5,
wherein the radiation from the projector enters the input diffractive element, in which it is divided into the red component of the image, a blue component of the image and a green component of the image and is directed to the sets of diffractive elements operating simultaneously,
wherein the first set of diffractive elements operates as follows:
a green upper component enters on the first linear diffractive optical element of the in-coupling diffractive element, then enters the out-coupling diffractive element, where radiation is multiplied by the first linear diffractive optical element of the out-coupling diffractive element, and is output to a user's eye using the second linear diffractive optical element of the out-coupling diffractive element,
a blue upper component enters on the first linear diffractive optical element of the in-coupling diffractive element, on which that part of it diffracts, which propagates at horizontal angle different from the angles of incidence of the green component, enters into the output diffractive element, where multiplication occurs on the first linear diffractive element of the output diffractive element, and is input in the user's eye using the second linear diffractive optical element of the out-coupling diffractive element,
a red upper component enters on the first linear diffractive optical element of the in-coupling diffractive element, on which that part of it diffracts, which propagates at a horizontal angle different from the angles of incidence of the green component and the blue component, enters the output diffractive element, where multiplication occurs by the first linear diffractive element of the out-coupling diffractive element, and is output to the eye of a user by means of the second linear diffractive optical element of the out-coupling diffractive element, wherein the second set of diffractive elements operates as follows:
a green lower component enters on the first linear diffractive optical element of the in-coupling diffractive element, then enters the output diffractive element, where multiplication occurs on the second linear diffractive optical element of the out-coupling diffractive element, and is output into the user's eye using the first linear diffractive optical element of the output diffractive element,
the red upper component enters on the first linear diffractive optical element of the in-coupling diffractive element, on which that part of it diffracts, which propagates at a horizontal angle different from the angles of incidence of the green component and the blue component, enters the output diffractive element, where multiplication occurs by the first linear diffractive element of the out-coupling diffractive element, and is output to the eye of the user by the second linear diffractive optical element of the out-coupling diffractive element, a red lower component enters on the first linear diffractive optical element of the input diffractive element, on which that part of it diffracts, which propagates at a horizontal angle different from the angles of incidence of the green component and the blue component, enters the output diffractive element, where multiplication occurs on the second linear diffractive the optical element of the output diffractive element, and is output to the user's eye by the first linear diffractive optical element of the output diffractive element, wherein the third set of diffractive elements operates as follows:

a green central upper component enters on the second linear diffractive optical element of the in-coupling diffractive element, then enters into the first multiplying diffractive element, where multiplication occurs, after which it enters the third linear diffractive optical element of the out-coupling diffractive element and is output to the user's eye, a red central upper component enters on the second linear diffractive optical element of the in-coupling diffractive element, on which diffracted is part propagates at a horizontal angle different from the angles of incidence of the green component, then enters the first multiplying diffractive element, where multiplication takes place, and then gets into the third linear diffractive optical element of the out-coupling diffractive element and output to the user's eye, a blue central upper component enters on the second linear diffractive optical element of the in-coupling diffractive element, on which that part of it diffracts, which propagates at a horizontal angle different from the angles of incidence of the green component and the red component, then enters into the first multiplying diffractive element, where multiplication takes place, after which it enters the third linear diffractive optical element of the out-coupling diffractive element and is displayed in the user's eye, and wherein the fourth set of diffractive elements operates as follows:

a green central lower component enters the second linear diffractive optical element of the in-coupling diffractive element, then enters the second multiplying diffractive element, where multiplication occurs, and then enters the third linear diffractive optical element of the out-coupling diffractive element and is output to the user's eye, a red central lower component enters on the second linear diffractive optical element of the in-coupling diffractive element, on which diffracted is part propagates at a horizontal angle different from an angle of incidence of the green component, then enters on the second multiplying diffractive element, where multiplication takes place, and then enters on the third linear diffractive optical element of the out-coupling diffractive element and output to the user's eye, and a blue central lower component enters on the second linear diffractive optical element of the in-coupling diffractive element, on which that part of it diffracts, which propagates at a horizontal angle different from the angles of incidence of the green component and the red component, then enters on the second multiplying diffractive element, where multiplication takes place, after which it enters on the third linear diffractive optical element of the out-coupling diffractive element and is output to the user's eye.

13. An augmented reality display device comprising:

an image projector;

a waveguide containing an architecture of diffractive optical elements comprising:

an in-coupling diffractive element configured to input radiation from the projector, and including a first linear diffractive optical element of the in-coupling diffractive element and a second linear diffractive optical element of the in-coupling diffractive element;

a first multiplying diffractive element and a second multiplying diffractive element configured to multiply radiation; and an out-coupling diffractive element configured to multiply radiation and output radiation from the waveguide, and includes a first linear diffractive optical element of an output diffractive element, a second linear diffractive optical element of the output diffractive element, a third linear diffractive optical element of the output diffractive element, wherein the in-coupling diffractive element is configured during an operation of the augmented reality display device, to separate the image from the projector into color components of the image red, green, and blue, and a direction of a path of beams of each of the color components through the corresponding set of diffractive elements, wherein along a course of radiation:

first set of diffractive elements consists from the first linear diffractive optical element of the in-coupling diffractive element, the first and second linear diffractive optical elements of the out-coupling diffractive element, second set of diffractive elements consists from the first linear diffractive optical element of the in-coupling diffractive element, the second and first linear diffractive optical elements of the out-coupling diffractive element, wherein a third set of diffractive elements consists of a second linear diffractive optical element of the in-coupling diffractive element of the first multiplying diffractive optical element and the third linear diffractive optical element of the output diffractive element, and wherein a fourth set of diffractive elements consists of a second linear diffractive optical element of an in-coupling diffractive element, a second multiplying diffractive element and a third linear diffractive optical element of an output diffractive element.

14. An augmented reality display device comprising:

an image projector;

a first waveguide containing an architecture of diffractive optical elements, a second waveguide containing the architecture of the diffractive optical elements:

wherein the first waveguide and the second waveguide containing the architecture of the diffractive optical elements comprises:

an in-coupling diffractive element configured to input radiation from the projector, and including a first linear diffractive optical element of the in-coupling diffractive element and a second linear diffractive optical element of the in-coupling diffractive element;
a first multiplying diffractive element and a second multiplying diffractive element configured to multiply radiation; and
an out-coupling diffractive element configured to multiply radiation and output radiation from the waveguide, and includes a first linear diffractive optical element of an output diffractive element, a second linear diffractive optical element of the output diffractive element, a third linear diffractive optical element of the output diffractive element,
wherein the in-coupling diffractive element is configured during an operation of the augmented reality display device, to separate the image from the projector into color components of the image red, green, and blue, and a direction of a path of beams of each of the color components through the corresponding set of diffractive elements, wherein along a course of radiation:
first set of diffractive elements consists from the first linear diffractive optical element of the in-coupling diffractive element, the first and second linear diffractive optical elements of the out-coupling diffractive element,
second set of diffractive elements consists from the first linear diffractive optical element of the in-coupling diffractive element, the second and first linear diffractive elements of the out-coupling diffractive element,
wherein the third set of diffractive elements consists of a second linear diffractive optical element of the in-coupling diffractive element of the first multiplying diffractive element and the third linear diffractive optical element of the output diffractive element,
wherein a fourth set of diffractive elements consists of a second linear diffractive optical element of an in-coupling diffractive element, a second multiplying diffractive element and a third linear diffractive optical element of an output diffractive element,
wherein, in the first waveguide, the direction of the path of the beams of each of the color components depends on parameters of the diffractive elements, calculated from a system of equations:

$$\begin{cases} \left| \vec{k_{\lambda_b,\theta,\delta}} - \vec{K_5} \right| = \frac{2\pi n_{\lambda_b}}{\lambda_b} \\ \left| \vec{k_{\lambda_g,\ldots\theta,0}} + \vec{K_6} \right| = \frac{2\pi}{\lambda_g} \\ \left| \vec{k_{\lambda_g,\theta,0}} + \vec{K_5} + \vec{K_6} \right| = \frac{2\pi}{\lambda_g} \\ \left| \vec{k_{\lambda_r,\theta,0}} - \vec{K_7} \right| = \frac{2\pi n_{\lambda_r}}{\lambda_r} \\ \left| \vec{k_{\lambda_b,\theta,0}} + \vec{K_1} \right| = \frac{2\pi n_{\lambda_b}}{\lambda_b} \\ \left( \vec{k_{\lambda_b,\theta,0}} + \vec{K_1} \right)_x = 0 \\ 0 = \min\left( \left| \vec{k_{\lambda_g,\ldots\theta,\delta}} - \vec{K_7} \right| - \frac{2\pi}{\lambda_g}, \right. \\ \left. \left| \vec{k_{\lambda_b,\ldots\theta,\ldots\delta}} + \vec{K_1} \right| - \frac{2\pi}{\lambda_b} \right) \end{cases}$$

where $\vec{k_{l,x,y}}$ is a wave vector of an electromagnetic wave, defined by three coordinates l, x, y, where l is a length of the electromagnetic wave, x is an angular coordinate of the electromagnetic wave in the x direction, y is the angular coordinate of the electromagnetic wave in the y direction, $n_{\lambda_b}$ is a refractive index of an optical system for a wavelength $\lambda_b$, $n_{\lambda_g}$ is the refractive index of the optical system for the wavelength $\lambda_g$, $n_{\lambda_r}$ is the refractive index of the optical system for the wavelength $\lambda_r$, $\lambda_b$ is the length of the electromagnetic wave corresponding to blue, $\lambda_g$ is the length of the electromagnetic wave corresponding to green, $\lambda_r$ is the length of the electromagnetic wave corresponding to red, θ is the maximum angle of a transmitted field of view in the x direction when a size of a field of view in the x direction is $2^\theta$, and δ is the maximum angle of a transmitted field of view in the y direction when the size of the field of view in the y direction is $2^\delta$, and wherein an initial data for solving this system of equations are used electromagnetic wavelengths ($\lambda_b$, $\lambda_g$, $\lambda_r$), refractive indices of the optical system for used wavelengths ($n_{\lambda_b}$, $n_{\lambda_r}$, $n_{\lambda_g}$) an aspect ratio of sides of the field of view (θ/δ), as well as the following geometric relationships of vectors of linear elements:

$\vec{K_{5y}}=0$, $\vec{K_{6y}}=0$, $\vec{K_{7x}}=\vec{K_{8x}}$, $\vec{K_{1x}}=\vec{K_{2x}}$, $\vec{K_{1y}}=-\vec{K_{2y}}$, $\vec{K_{3x}}=\vec{K_{4x}}$, $\vec{K_{3y}}=\vec{K_{4y}}$, where vectors, $\vec{K_1}$, $\vec{K_2}$ correspond to "+1" and "−1" diffraction orders of the second linear diffractive optical element of the in-coupling diffractive element, vector $\vec{K_3}$ corresponds to the second multiplying diffractive element, vector $\vec{K_4}$ corresponds to the first multiplying diffractive element, vector $\vec{K_5}$ corresponds to third linear diffractive optical element of the out-coupling diffractive element, vector $\vec{K_6}$ corresponds to first linear diffractive optical element of the in-coupling diffractive element, vector $\vec{K_7}$ corresponds to second linear diffractive optical element of the out-coupling diffractive element, and vector $\vec{K_8}$ corresponds to first linear diffractive optical element of the out-coupling diffractive element, wherein, in the second waveguide, the direction of the path of the beams of each of the color components depends on the parameters of the diffractive elements, calculated from the system of equations:

$$\begin{cases} \left|\vec{k_{\lambda_\delta,\ldots\theta,0}} - \vec{K_5}\right| = \frac{2\pi}{\lambda_b} \\ \left|\vec{k_{\lambda_r,-\theta,\delta}} - \vec{K_5}\right| = \frac{2\pi n_{\lambda_r}}{\lambda_r} \\ \left|\vec{k_{\lambda_r,\ldots\theta,\delta}} - \vec{K_5} + \vec{K_8}\right| = \frac{2\pi}{\lambda_r} \\ \left|\vec{k_{\lambda_r,\ldots\theta,\varphi}} - \vec{K_5} + \vec{K_8}\right| = \frac{2\pi n\lambda_r}{\lambda_r} \\ \left|\vec{k_{\lambda_r,\theta,\psi}} - \vec{K_5} + \vec{K_8}\right| = \frac{2\pi n\lambda_r}{\lambda_r} \\ \frac{2\pi}{\lambda_r} = \min\left(\left|\vec{k_{\lambda_r,\theta,\psi}} + \vec{K_2}\right|, \left|\vec{k_{\lambda_r,\ldots\theta,\varphi}} + \vec{K_2}\right|\right) \\ \left(\left|\vec{k_{\lambda_r,\ldots\theta,0}} + \vec{K_2}\right|\right)_x = 0 \\ \left|\vec{k_{\lambda_b,\theta,0}} + \vec{K_2}\right| = \frac{2\pi n_{\lambda_b}}{\lambda_0} \end{cases}$$

where $\vec{k_{l,x,y}}$ is the wave vector of an electromagnetic wave, defined by three coordinates l, x, y, where l is the length of the electromagnetic wave, x is the angular coordinate of the electromagnetic wave in the x direction, y is the angular coordinate of the electromagnetic wave in the y direction, $n_{\lambda_b}$ is the refractive index of the optical system for the wavelength $\lambda_b$, $n_{\lambda_r}$ is the refractive index of the optical system for the wavelength $\lambda_r$, $\lambda_b$ is the length of the electromagnetic wave corresponding to blue, $\lambda_r$ is the length of the electromagnetic wave corresponding to red, and φ and ψ are the angles within a field of view in the y direction, which are the angles of contact of two parts of the field of view, transmitted sets 1, 2 and sets 3, 4, and wherein the initial data for solving this system of equations are the used electromagnetic wavelengths ($\lambda_b, \lambda_r$), the refractive indices of the optical system for used wavelengths ($n_{\lambda_b}, n_{\lambda_r}$), the aspect ratio of the sides of the field of view (θ/δ), as well as the following geometric relationships of vectors of linear elements resulting from geometric features of the waveguide architecture:

$\vec{K_{5y}}=0$, $\vec{K_{6y}}=0$, $\vec{K_{7x}}=\vec{K_{8x}}$, $\vec{K_{1x}}=\vec{K_{2x}}$, $\vec{K_{1y}}=-\vec{K_{2y}}$, $\vec{K_{3x}}=\vec{K_{4x}}$, $\vec{K_{3y}}=\vec{K_{4y}}$, where vectors $\vec{K_1}$, $\vec{K_2}$ correspond to "+1" and "−1" diffraction orders of the second linear diffractive optical element of the in-coupling diffractive element, vector $\vec{K_3}$ corresponds to the second multiplying diffractive element, vector $\vec{K_4}$ corresponds to the first multiplying diffractive optical element, vector $\vec{K_5}$ corresponds to third linear diffractive element of the out-coupling diffractive element, vector $\vec{K_6}$ corresponds to first linear diffractive optical element of the in-coupling diffractive element, vector $\vec{K_7}$ corresponds to second linear diffractive optical element of the out-coupling diffractive element, and vector $\vec{K_8}$ corresponds to first linear diffractive optical element of the out-coupling diffractive element.

15. An augmented reality display device comprising:
an image projector;
a waveguide containing an architecture of diffractive optical elements comprising:
   an in-coupling diffractive element configured to input radiation from the projector, and including a first linear diffractive optical element of the in-coupling diffractive element and a second linear diffractive optical element of the in-coupling diffractive element;
   a first multiplying diffractive element and a second multiplying diffractive element configured to multiply radiation; and
   an out-coupling diffractive element configured to multiply radiation and output radiation from the waveguide, and includes a first linear diffractive optical element of an output diffractive element, a second linear diffractive optical element of the output diffractive element, a third linear diffractive optical element of the output diffractive element,
wherein the in-coupling diffractive element is configured during an operation of the augmented reality display device, to separate the image from the projector into color components of the image red, green, and blue, and a direction of a path of beams of each of the color components through the corresponding set of diffractive elements, wherein along a course of radiation:
   a first set of diffractive elements consists from the first linear diffractive optical element of the in-coupling diffractive element, the first and second linear diffractive optical elements of the out-coupling diffractive element,
   a second set of diffractive elements consists from the first linear diffractive optical element of the in-coupling diffractive element, the second and first linear diffractive optical elements of the out-coupling diffractive element,
wherein a third set of diffractive elements consists of a second linear diffractive optical element of the in-coupling diffractive element of the first multiplying diffractive optical element and the third linear diffractive optical element of the output diffractive element,
wherein a fourth set of diffractive elements consists of a second linear diffractive optical element of an in-coupling diffractive element, a second multiplying diffractive element and a third linear diffractive optical element of an output diffractive element, and
wherein the first and second sets of diffractive elements are located on one side of the waveguide, and the third set and the fourth set of diffractive elements are located on the opposite side of the waveguide.

16. An augmented reality display device comprising:
an image projector;
at least one waveguide containing at least on architecture of diffractive optical elements comprising:
   an in-coupling diffractive element configured to input radiation from the projector, and including a first linear diffractive optical element of the in-coupling diffractive element and a second linear diffractive optical element of the in-coupling diffractive element;
   a first multiplying diffractive element and a second multiplying diffractive element configured to multiply radiation; and
   an out-coupling diffractive element configured to multiply radiation and output radiation from the waveguide, and includes a first linear diffractive optical element of an output diffractive element, a second linear diffractive optical element of the output diffractive element, a third linear diffractive optical element of the output diffractive element,
wherein the in-coupling diffractive element is configured during an operation of the augmented reality display device, to separate the image from the projector into color components of the image red, green, and blue, and a direction of a path of beams of each of the color components through the corresponding set of diffractive elements,
wherein along a course of radiation:
first set of diffractive elements consists from the first linear diffractive optical element of the in-coupling diffractive element, the first and second linear diffractive optical elements of the out-coupling diffractive element,
second set of diffractive elements consists from the first linear diffractive optical element of the in-coupling diffractive element, the second and first linear diffractive optical elements of the out-coupling diffractive element,
wherein a third set of diffractive elements consists of a second linear diffractive optical element of the in-coupling diffractive element of the first multiplying diffractive optical element and the third linear diffractive optical element of the output diffractive element, and
wherein a fourth set of diffractive elements consists of a second linear diffractive optical element of an in-coupling diffractive element, a second multiplying diffractive element and a third linear diffractive optical element of an output diffractive element.

17. Augmented reality glasses containing an element for a left eye and an element for a right eye, and each of the elements for the left eye and the right eye is a device for displaying an augmented reality, comprising:
an image projector;
a waveguide containing an architecture of diffractive optical elements comprising:
an in-coupling diffractive element configured to input radiation from the projector, and including a first linear diffractive optical element of the in-coupling diffractive element and a second linear diffractive optical element of the in-coupling diffractive element;
a first multiplying diffractive element and a second multiplying diffractive element configured to multiply radiation; and
an out-coupling diffractive element configured to multiply radiation and output radiation from the waveguide, and includes a first linear diffractive optical element of an output diffractive element, a second linear diffractive optical element of the output diffractive element, a third linear diffractive optical element of the output diffractive element,
wherein the in-coupling diffractive element is configured during an operation of the augmented reality glasses, to separate the image from the projector into color components of the image red, green, and blue, and a direction of a path of beams of each of the color components through the corresponding set of diffractive elements, wherein along a course of radiation:
first set of diffractive elements consists from the first linear diffractive optical element of the in-coupling diffractive element, the first and second linear diffractive optical elements of the out-coupling diffractive element,
second set of diffractive elements consists from the first linear diffractive optical element of the in-coupling diffractive element, the second and first linear diffractive optical elements of the out-coupling diffractive element,
wherein the third set of diffractive elements consists of a second linear diffractive optical element of the in-coupling diffractive element of the first multiplying diffractive optical element and the third linear diffractive optical element of the output diffractive element,
wherein a fourth set of diffractive elements consists of a second linear diffractive optical element of an in-coupling diffractive element, a second multiplying diffractive element and a third linear diffractive optical element of an output diffractive element, and
wherein a waveguide including a diffractive optical element architecture is located in each of a right-eye element and a left-eye element such that the out-coupling diffractive element is located opposite a user's eye.

18. Augmented reality glasses containing an element for a left eye and an element for a right eye, and each of the elements for the left eye and the right eyes is a device for displaying an augmented reality comprising:
an augmented reality display device comprising:
an image projector;
a first waveguide containing an architecture of diffractive optical elements; and
a second waveguide containing the architecture of the diffractive optical elements,
wherein the first waveguide and the second waveguide containing the architecture of the diffractive optical elements comprises:
an in-coupling diffractive element configured to input radiation from the projector, and including a first linear diffractive optical element of the in-coupling diffractive element and a second linear diffractive optical element of the in-coupling diffractive element;
a first multiplying diffractive element and a second multiplying diffractive element configured to multiply radiation; and
an out-coupling diffractive element configured to multiply radiation and output radiation from the waveguide, and includes a first linear diffractive optical element of an output diffractive element, a second linear diffractive optical element of the output diffractive element, a third linear diffractive optical element of the output diffractive element,
wherein the in-coupling diffractive element is configured during an operation of the augmented reality display device, to separate the image from the projector into color components of the image red, green, and blue, and a direction of a path of beams of each of the color components through the corresponding set of diffractive elements, wherein along a course of radiation:
first set of diffractive elements consists from the first linear diffractive optical element of the in-coupling diffractive element, the first and second linear diffractive optical elements of the out-coupling diffractive element,
second set of diffractive elements consists from the first linear diffractive optical element of the in-coupling diffractive element, the second and first linear diffractive optical elements of the out-coupling diffractive element, wherein the third set of diffractive elements consists of a second linear diffractive optical element of the in-coupling diffractive element of the first multiplying diffractive element and the third linear diffractive optical element of the output diffractive element, wherein a fourth set of diffractive elements consists of a second linear diffractive optical element of an in-coupling diffractive element, a second multiplying diffractive element and a third linear diffractive optical element of an output diffractive element, wherein, in the first waveguide, the direction of the path of the beams of each of the color components depends on parameters of the diffractive elements, calculated from a system of equations:

$$\begin{cases} \left| \vec{k}_{\lambda_b,\theta,\delta} - \vec{K_5} \right| = \frac{2\pi n_{\lambda_b}}{\lambda_b} \\ \left| \vec{k}_{\lambda_g,\ldots\theta,0} + \vec{K_6} \right| = \frac{2\pi}{\lambda_g} \\ \left| \vec{k}_{\lambda_g,\theta,0} + \vec{K_5} + \vec{K_6} \right| = \frac{2\pi}{\lambda_g} \\ \left| \vec{k}_{\lambda_r,\theta,0} - \vec{K_7} \right| = \frac{2\pi n_{\lambda_r}}{\lambda_r} \\ \left| \vec{k}_{\lambda_b,\theta,0} + \vec{K_1} \right| = \frac{2\pi n_{\lambda_b}}{\lambda_b} \\ \left( \vec{k}_{\lambda_b,\theta,0} + \vec{K_1} \right)_x = 0 \\ 0 = \min\left( \left| \vec{k}_{\lambda_g,\ldots\theta,\delta} - \vec{K_7} \right| - \frac{2\pi}{\lambda_g}, \\ \left| \vec{k}_{\lambda_b,\ldots\theta,\ldots\delta} + \vec{K_1} \right| - \frac{2\pi}{\lambda_b} \right) \end{cases}$$

where $\vec{k}_{l,x,y}$ is a wave vector of an electromagnetic wave, defined by three coordinates l, x, y, where l is a length of the electromagnetic wave, x is an angular coordinate of the electromagnetic wave in the x direction, y is the angular coordinate of the electromagnetic wave in the y direction, $n_{\lambda_b}$ is a refractive index of an optical system for a wavelength $\lambda_b$, $n_{\lambda_g}$ is the refractive index of the optical system for the wavelength $\lambda_g$, $n_{\lambda_r}$ is the refractive index of the optical system for the wavelength $\lambda_r$, $\lambda_b$ is the length of the electromagnetic wave corresponding to blue, $\lambda_g$ is the length of the electromagnetic wave corresponding to green, $\lambda_r$ is the length of the electromagnetic wave corresponding to red, $\theta$ is the maximum angle of a transmitted field of view in the x direction when a size of a field of view in the x direction is $2\theta$, and $\delta$ is the maximum angle of a transmitted field of view in the y direction when the size of the field of view in the y direction is $2\delta$, and wherein an initial data for solving this system of equations are used electromagnetic wavelengths ($\lambda_b$, $\lambda_g$, $\lambda_r$), refractive indices of the optical system for used wavelengths ($n_{\lambda_b}$, $n_{\lambda_r}$, $n_{\lambda_g}$) an aspect ratio of sides of the field of view ($\theta/\delta$), as well as the following geometric relationships of vectors of linear elements:

$\vec{K_{5y}}=0$, $\vec{K_{6y}}=0$, $\vec{K_{7x}}=\vec{K_{8x}}$, $\vec{K_{1x}}=\vec{K_{2x}}$, $\vec{K_{1y}}=-\vec{K_{2y}}$, $\vec{K_{3x}}=\vec{K_{4x}}$, $\vec{K_{3y}}=\vec{K_{4y}}$, where vectors, $\vec{K_1}$, $\vec{K_2}$ correspond to "+1" and "−1" diffraction orders of the second linear diffractive optical element of the in-coupling diffractive element, vector $\vec{K_3}$ corresponds to the second multiplying diffractive element, vector $\vec{K_4}$ corresponds to the first multiplying diffractive element, vector $\vec{K_5}$ corresponds to third linear diffractive optical element of the out-coupling diffractive element, vector $\vec{K_6}$ corresponds to first linear diffractive optical element of the in-coupling diffractive element, vector $\vec{K_7}$ corresponds to second linear diffractive optical element of the out-coupling diffractive element, and vector $\vec{K_8}$ corresponds to first linear diffractive optical element of the out-coupling diffractive element, wherein, in the second waveguide, the direction of the path of the beams of each of the color components depends on the parameters of the diffractive elements, calculated from the system of equations:

$$\begin{cases} \left| \vec{k}_{\lambda_g,\ldots\theta,0} - \vec{K_5} \right| = \frac{2\pi}{\lambda_b} \\ \left| \vec{k}_{\lambda_r,-\theta,\delta} - \vec{K_5} \right| = \frac{2\pi n_{\lambda_r}}{\lambda_r} \\ \left| \vec{k}_{\lambda_r,\ldots\theta,\delta} - \vec{K_5} + \vec{K_8} \right| = \frac{2\pi}{\lambda_r} \\ \left| \vec{k}_{\lambda_r,\ldots\theta,\varphi} - \vec{K_5} + \vec{K_8} \right| = \frac{2\pi n_{\lambda_r}}{\lambda_r} \\ \left| \vec{k}_{\lambda_r,\theta,\psi} - \vec{K_5} + \vec{K_8} \right| = \frac{2\pi n_{\lambda_r}}{\lambda_r} \\ \frac{2\pi}{\lambda_r} = \min\left( \left| \vec{k}_{\lambda_r,\theta,\psi} + \vec{K_2} \right|, \left| \vec{k}_{\lambda_r,\ldots\theta,\varphi} + \vec{K_2} \right| \right) \\ \left( \left| \vec{k}_{\lambda_r,\ldots\theta,0} + \vec{K_2} \right| \right)_x = 0 \\ \left| \vec{k}_{\lambda_b,\theta,0} + \vec{K_2} \right| = \frac{2\pi n_{\lambda_b}}{\lambda_0} \end{cases}$$

where $\vec{k}_{l,x,y}$ is the wave vector of an electromagnetic wave, defined by three coordinates l, x, y, where l is the length of the electromagnetic wave, x is the angular coordinate of the electromagnetic wave in the x direction, y is the angular coordinate of the electromagnetic wave in the y direction, $n_{\lambda_b}$ is the refractive index of the optical system for the wavelength $\lambda_b$, $n_{\lambda_r}$ is the refractive index of the optical system for the wavelength $\lambda_r$, $\lambda_b$ is the length of the electromagnetic wave corresponding to blue, $\lambda_r$ is the length of the electromagnetic wave corresponding to red, and $\varphi$ and $\psi$ are the angles within a field of view in the y direction, which are the angles of contact of two parts of the field of view, transmitted sets 1, 2 and sets 3, 4, wherein the initial data for solving this system of equations are the used electromagnetic wavelengths ($\lambda_b$, $\lambda_r$), the refractive indices of the optical system for used wavelengths ($n_{\lambda_b}, n_{\lambda_r}$), the aspect ratio of the sides of the field of view ($\theta/\delta$), as well as the following geometric relationships of vectors of linear elements resulting from geometric features of the waveguide architecture: $\vec{K}_{5y}=0$, $\vec{K}_{6y}=0$, $\vec{K}_{7x}=\vec{K}_{8x}$, $\vec{K}_{1x}=\vec{K}_{2x}$, $\vec{K}_{1y}=-\vec{K}_{2y}$, $\vec{K}_{3x}=\vec{K}_{4x}$, $\vec{K}_{3y}=\vec{K}_{4y}$, where vectors $\vec{K}_1$, $\vec{K}_2$ correspond to "+1" and "−1" diffraction orders of the second linear diffractive optical element of the in-coupling diffractive element, vector $\vec{K}_3$ corresponds to the second multiplying diffractive element, vector $\vec{K}_4$ corresponds to the first multiplying diffractive element, vector $\vec{K}_5$ corresponds to third linear diffractive optical element of the out-coupling diffractive element, vector $\vec{K}_6$ corresponds to first linear diffractive optical element of the in-coupling diffractive element, vector $\vec{K}_7$ corresponds to second linear diffractive optical element of the out-coupling diffractive element, and vector $\vec{K}_8$ corresponds to first linear diffractive optical element of the out-coupling diffractive element, and wherein the first waveguides and the second waveguides are located in each of a right-eye element and a left-eye element such that the diffractive output elements are located opposite a user's eye.

* * * * *